(12) United States Patent
Lalevee et al.

(10) Patent No.: US 10,266,616 B2
(45) Date of Patent: Apr. 23, 2019

(54) LIGHT INDUCED FREE RADICAL AND/OR CATIONIC PHOTOPOLYMERIZATION METHOD

(71) Applicants: Université de Haute-Alsace, Mulhouse (FR); Centre National de la Recherche Scientifique—CNRS, Paris (FR); Université d'Aix-Marseille, Marseille (FR)

(72) Inventors: Jacques Lalevee, Mulhouse (FR); Pu Xiao, Mulhouse (FR); Didier Gigmes, Allauch (FR); Frederic Dumur, La Ferte-Bernard (FR)

(73) Assignees: UNIVERSITÉ DE HAUTE-ALSACE, Mulhouse (FR); CENTRE NATIONAL DE LA RECHERCHE SCIENTIFIQUE—CNRS, Paris (FR); UNIVERSITÉ D'AIX MARSEILLE, Marseille (FR)

( * ) Notice: Subject to any disclaimer, the term of this patent is extended or adjusted under 35 U.S.C. 154(b) by 32 days.

(21) Appl. No.: 15/123,997

(22) PCT Filed: Mar. 4, 2015

(86) PCT No.: PCT/EP2015/054501
§ 371 (c)(1),
(2) Date: Sep. 6, 2016

(87) PCT Pub. No.: WO2015/132295
PCT Pub. Date: Sep. 11, 2015

(65) Prior Publication Data
US 2017/0073436 A1    Mar. 16, 2017

(30) Foreign Application Priority Data
Mar. 6, 2014 (EP) .................................... 14158217

(51) Int. Cl.
| | | |
|---|---|---|
| C08F 2/50 | (2006.01) | |
| C08F 122/10 | (2006.01) | |
| C08G 59/24 | (2006.01) | |
| C08G 59/68 | (2006.01) | |
| C08G 65/10 | (2006.01) | |
| C08L 63/00 | (2006.01) | |
| C08K 5/54 | (2006.01) | |

(52) U.S. Cl.
CPC ............ *C08F 2/50* (2013.01); *C08F 122/105* (2013.01); *C08G 59/24* (2013.01); *C08G 59/688* (2013.01); *C08G 65/105* (2013.01); *C08K 5/5403* (2013.01); *C08L 63/00* (2013.01); *C08L 2312/06* (2013.01)

(58) Field of Classification Search
CPC .......... C08F 2/50; C08F 122/05; C08G 59/24; C08G 65/105; C08G 163/00; C08G 59/60; C08G 59/68; C08L 2312/06
See application file for complete search history.

(56) References Cited

U.S. PATENT DOCUMENTS

| | | | | |
|---|---|---|---|---|
| 3,860,500 A | * | 1/1975 | Gysling | .................... C07F 9/02 205/126 |
| 3,860,501 A | * | 1/1975 | Gysling | .................... C07F 9/02 205/126 |
| 4,238,619 A | * | 12/1980 | Crivello | ................. C07C 381/12 522/31 |
| 4,342,673 A | * | 8/1982 | Wolfrey | ............... C08G 59/226 523/400 |
| 4,845,159 A | * | 7/1989 | Chao | ........................ C08G 8/28 525/390 |
| 5,547,713 A | * | 8/1996 | Alvarado | ............. C08G 59/245 257/E23.007 |
| 5,667,893 A | * | 9/1997 | Kinzer | ................. C08G 59/145 428/413 |
| 5,668,192 A | | 9/1997 | Castellanos et al. | |
| 6,372,350 B1 | * | 4/2002 | Scott | ...................... C08G 59/24 428/413 |
| 8,530,002 B1 | | 9/2013 | Hibbs et al. | |
| 9,708,442 B1 | * | 7/2017 | Kwisnek | .............. C08G 59/226 |

FOREIGN PATENT DOCUMENTS

| | | |
|---|---|---|
| EP | 1153942 A1 | 11/2001 |
| EP | 1837352 A1 | 9/2007 |
| EP | 2248835 A1 | 11/2010 |
| GB | 2085011 A | 4/1982 |
| JP | 2012229310 A | 11/2012 |

OTHER PUBLICATIONS

Garra et al. Copper (Photo)redox Catalyst for Radical Photopolymerization in Shadowed Areas and Access to Thick and Filled Samples. Macromolecules 2017 50(10), pp. 3761-3771 (Year: 2017).*
Xiao et al. Copper Complexes in Radical Photoinitiating Systems: Applications to Free Radical and Cationic Polymerization upon Visible LEDs. Macromolecules, 2014, 47 (12) , pp. 3837-3844. (Year: 2014).*
Odian, G. G. (1991). Principles of Polymerization. New York: Wiley. p. 516 (Year: 1991).*
Iakovidis et al. Copper and Its Complexes in Medicine: A Biological Approch. Molecular Biology International. vol. 2011, pp. 1-13. (2011) [online]. [retrived on Mar. 12, 2018]. Retrived from Internet <URL:https://www.ncbi.nlm.nih.gov/pmc/articles/PMC3195324/> (Year: 2011).*
International Search Report dated May 18, 2015 re: Application No. PCT/EP2015/054501; pp. 1-4; citing: GB 2 085 011 A, EP 1 153 942 A1, EP 1 837 352 A1, EP 2 248 835 A1, JP 2012 229310 A, Jacques Lalev EE et al., Yu. P. Barinova et al., US 8 530 002 B1.
Written Opinion dated May 18, 2015 re: Application No. PCT/EP2015/054501; pp. 1-11; citing: GB 2 085 011 A, EP 1 153 942 A1, EP 1 837 352 A1, EP 2 248 835 A1 and JP 2012 229310 A.
Abeer A. Alzahrani et al. "Evaluation and development of novel photoinitiator complexes for photointiating the copper-catalyzed azide-alkyne cycloaddition reaction", Polymer Chemistry, Royal Society fo Chemistry, 2014, vol. 5, pp. 1874-1882.

(Continued)

*Primary Examiner* — Sanza L. McClendon
(74) *Attorney, Agent, or Firm* — Cantor Colburn LLP

(57) ABSTRACT

The present invention relates to a new method of light induced photopolymerization under mild irradiation conditions, copper initiator complexes to be used in such method and a polymers obtained by such method.

16 Claims, 10 Drawing Sheets

(56) References Cited

OTHER PUBLICATIONS

Augusto C. Hernandez-Perez et al. "Toward a Visible Light Mediated Photocyclization: Cu-Based Sensitizers for the Synthesis of [5]Helicene", Organic Letters, 2012, vol. 14, No. 12, pp. 2988-2991.

Cynthia E. Atkins et al. "A Two-Level Approach to Deconvoluting Absorbance Data Involving Multiple Species. Application to Copper Systems", American Chemical Society, 1984, vol. 23, No. 5, pp. 569-572.

David A. Nagib et al. "Enantioselective α-Trifluoromethyl of Aldehydes via Photoredox Organocatalysis", Journal of American Chemical Society, 2009, vol. 131, pp. 10875-10877.

David A. Nicewicz et al. "Merging Photoredox Catalysis with Organocatalysis: The Direct Asymmetric Alkylation of Aldehydes", Science AAAS, 2008, vol. 322, pp. 77-80.

Dieter Rehm et al. "Kinetics of Fluorescence Quenching by Electron and H-Atom Transfer", Israel Journal of Chemistry, 21st Farkas Memorial Symposium, 1970, vol. 8, pp. 259-271.

Dominik Konkolewicz et al. "Visible Light and Sunlight Photoinduced ATRP with ppm of Cu Catalyst", ACS Macro Letters, 2012, vol. 1, 1219-1223.

Douglas G. Cuttell et al. "Simple Cu(I) Complexes with Unprecedented Excited-State Liftimes", Journal American Chemical Society, 2002, vol. 124, No. 1, pp. 6-7.

F. Castellanos et al. "Synthesis, Reactivity, and Properties of New Diaryliodonium Salts as Photoinitiators for the Cationic Polymerization of Epoxy Silicones", Journal of Applied Polymer Science, 1996, vol. 60, pp. 705-713.

Hui-Wen Shih et al. "Enantioselective a-Benzylation of Aldehydes via Photoredox Organocatalysis", Journal of American Chemical Society, 2010, vol. 132, pp. 13600-13603.

Jacques Lalevee et al. "A Novel Photopolymerization Intiating System Based on an Iridium Complex Photocatalyst", Macromolecular Rapid Communications, 2011, vol. 32, pp. 917-920.

Jacques Lalevee et al. "Efficient dual radical/cationic photoinitiator under visible light: a new concept", The Royal Society of Chemistry, 2011, vol. 2, pp. 1986-1991.

Jacques Lalevee et al. "Green Bulb Light Source Induced Epoxy Cationic Polymerization under Air Using Tris(2,2-bipyridine)ruthenium(II) and Silyl Radicals", Macromolecules, 2010, vol. 43, pp. 10191-10195.

Jacques Lalevee et al. "Iridium Photocatalysts in Free Radical Photopolymerization under Visible Lights", ACS Macro Letters, 2012, vol. 1, pp. 286-290.

Jacques Lalevee et al. "N-Vinylcarbazole: An Additive for Free Radical Promoted Cationic Polymerization upon Visible Light", ACS Macro Letters, 2012, vol. 1, pp. 802-806.

Jacques Lalevee et al. "Photopolymerization of N-Vinylcarbazole Using Visible-Light Harvesting Iridium Complexes as Photointiators", Macromolecules, ACS Publications, 2012, vol. 45, pp. 4134-4141.

Jacques Lalevee et al. "Subtle Ligand Effects in Oxidative Photocatalysis with Iridium complexes: Application to Photopolymerization", Chemistry a European Journal, 2011, vol. 17, pp. 15027-15031.

Kirsten Zeitler "Photoredox Catalysis with Visible Light", Angewandte Chemie, 2009, vol. 48, pp. 9785-9789.

Li-Yan Wang et al. "Electrospinning fabrication and oxygen sensing properties of Cu(I) complex-polystyrene composite microfibrous membranes", Journal of Luminescence, 2011, vol. 131, pp. 1277-1282.

Maud Save et al. "Controlled Ring-Opening Polymerization of Lactones and Lactides Intitiated by Lanthanum Isopropoxide, 1", General Aspects and Kinetics, Macromolecular Chemistry and Physics, 2002, vol. 203, pp. 889-899.

Mehmet Atilla Tasdelen et al. "Visible Light-Induced Atom Transferr Radical Polymerization" Macromolecular Chemistry and Physics, 2012, vol. 2013, pp. 1391-1396.

Michael Pirtsch et al. "[Cu(dap)2Cl] As an Efficient Visible-Light-Driven Photoredox Catalyst in Carbon-Carbon Bond-Forming Reactions", Chemistry a European Journal, 2012, vol. 18, pp. 7336-7340.

Mohamad-Ali Tehfe et al. "Iridium complexes incorporating coumarin moiety as catalyst photoinitiators: Towards household green LED bulb and halogen lamp irradiation", Polymer, 2012, vol. 53, pp. 2803-2808.

Mohamad-Ali Tehfe et al. "Cationic photosensitive formulations based on silyl radical chemistry for green and red diode laser exposure", Polymer Chemistry, 2012, vol. 3, pp. 1899-1902.

Mohamad-Ali Tehfe et al. "Polyaromatic Structures as Organo-Photointiator Catalysts for Efficient Visible Light Induced Dual Radical/Cationic Photopolymerization and Interpenetrated Polymer Networks Synthesis", Macromolecules, ACS Publications, 2012, vol. 45, pp. 4454-4460.

Mohamed-Ali Tehfe et al. "Tunable Organophotocatalysts for Polymerization Reactions Under Visible Lights." Macromolecules, ACS Publications, 201, vol. 45, pp. 1746-1752.

Mustafa Ciftci et al. "Photointiated ATRP in Inverse Microemulsion", Macromolecules, ACS Publications, 2013, vol. 46, pp. 9537-9543.

Nicola Armarloi et al. "Highly Luminescent Cu Complexes for Light-Emiitting Electrochemical Cells", Advanced Materials, 2006, vol. 18, pp. 1313-1316.

Nicola Armaroli et al. "Heteroleptic Cu(I) complexes containing phenanthroline-type and 1, 1-bis (diphenylphosphino) ferrocene ligands: Structure and electronic properties", Inorganica Chimica Acta, 2007, vol. 360, pp. 1032-1042.

P. Xiao et al. "Photoinitiation Mechanism of Free Radical Photopolymerization in the Presence of Cyclic Acetals and Related Compounds", Journal of Polymer Science: Part A: Polymer Chemistry, 2010, vol. 48, pp. 5758-5766.

Philippe Renaud et al. "A Light Touch Catalyzes Asymmetric Carbon-Carbon Bond Formation", Science AAAS, vol. 322, pp. 55-56.

Phong V. Pham et al. "Photoredox Catalysis: A Mile, Operationally Simple Approach to the Synthesis of α-Trifluoromethyl Carbonyl Compounds", Angew. Chem. Int. Ed., 2011, vol. 50, pp. 6119-6122.

Pu Xiao et al. "Cationic and Thiol-Ene Photopolymerization upon Red Lights Using Anthraquinone Derivaties as Photoinitiators", Macromolecules, ACS Publications, 2013, vol. 46, pp. 6744-6750.

Pu Xiao et al. "Difunctional acridinediones as photointiators of polymerization under UV and visible lights: Structural effects", Polymer, 2013, vol. 54, pp. 3458-3466.

Pu Xiao et al. "Variations on the Benzophenone Skeleton: Novel High Performance Blue Light Sensitive Photointiating Systems", Macromolecules ACS Publications, 2013, vol. 46, pp. 7661-7667.

Pu Xiao et al. "Visible light sensitive photointiating systems: Recent progress in cationic and radical photopolymerization reactions under soft conditions", Progress in Polymer Science, 2015, vol. 41, pp. 32-66.

Qisheng Zhang et al. "Highly Efficient Electroluminescence from Green-Light-Emitting Electrochemical Cells Based on Cu Complexes" Advanced Functional Materials, 2006, vol. 16, pp. 1203-1208.

Qisheng Zhang et al. "Novel Heteroleptic Cu Complexes with Tunable Emission Color for Efficient Phosporescent Light-Emitting Diodes", Advanced Functional Materials, 2007, vol. 17, pp. 2983-2990.

Qisheng Zhang et al. "Triplet Exciton Confinement in Green Organic Light-Omitting Diodes Containing Luminescent Charge-Transfer Cu (I) Complexes", Advanced Functional Materials, 2012, vol. 22, pp. 2327-2336.

Seth B. Harkins et al. "A Highly Emissive Cu2N2 Diamond Core Complex Supported by a [PNP] Ligand", Journal of American Chemical Society, 2005, vol. 127, pp. 2030-2031.

Shan-Ming Kuang et al. "Synthesis and Structural Characterization of Cu(I) and Ni(II) Complexes that Contain the Bis [2-(diphenylphosphino)phenyl]ether Ligand. Novel Emission Properties for the Cu(I) Species", Inorganic Chemistry, 2002, vol. 41, pp. 3313-3322.

Tao Gong et al. "A novel copper containing photoinitiator, copper (ii) acylphosphinate, and its application in both the photomediated

(56) References Cited

OTHER PUBLICATIONS

CuAAC reaction and in atom transfer radical polymerization", The Royal Society of Chemistry, 2013, vol. 49, pp. 7950-7952.

Tao Gong et al. "Photopolymerization Reactions Using the Photoinitiated Copper (I)-Catalyzed Azide-Alkyne Cycloaddition (CuAAC) Reaction", Advanced Materials, 2013, vol. 25, pp. 2024-2028.

Zhenjun Si et al. "Bright electrophosphorescent devices based on sterically hindered spacer-containing Cu(I) complex", Journal of Luminescence, 2008, vol. 128, pp. 1303-1306.

Zisheng Su et al. "Efficient white organic light-emitting diodes based on iridium complex snesitized copper complex", Journal of Physics D: Applied Physics, 2008, vol. 41, pp. 1-4.

* cited by examiner

LIGHT INDUCED FREE RADICAL AND/OR CATIONIC PHOTOPOLYMERIZATION METHOD

PRIORITY

This patent application claims priority to European Patent Application n° EP 14158217.1 filed on 6 Mar. 2014, the entire contents of which are hereby incorporated by reference.

FIELD OF THE INVENTION

The present invention relates to a new method of light induced photopolymerization under mild irradiation conditions, copper initiator complexes to be used in such method and a polymers obtained by such method.

In the present document, the numbers between brackets ([ ]) refer to the List of References provided at the end of the document.

BACKGROUND OF THE INVENTION

In recent years, photopolymerization, including cationic photopolymerization, has been the object of intense research because of the continued growth of academic and industrial applications for new monomers and/or photoinitiator systems. The use of photoinitiators increases steadily not only for traditional applications such as coatings, inks and adhesives but also more recently in high-tech applications such as optoelectronics, stereolithography and nanotechnology.

Photopolymerization offers many advantages compared to conventional thermal polymerization, such as the spatial control of the initiation, and the fact that polymerization can be carried out without solvent and therefore to reduced cost. Another important advantage is that it can be performed at room temperature, unlike thermal polymerization which often requires a high temperature, thereby allowing gains in terms of economic and energy cost savings. Finally, cationic polymerization is generally not oxygen-sensitive, which is a major advantage because it does not require the use of an inert atmosphere. Thus, cationic photopolymerization combines all the aforementioned advantages.

Thus far, most of the formulations used in photopolymerization have been usable only with high intensity UV lamps. This results in safety problems for the operator due to the wavelength used, in addition to a non-optimal energetic efficiency, thereby reducing the scope of this approach. To overcome these problems, the use of mild irradiation conditions is therefore a major challenge and the development of new highly absorbent in the visible and allowing the use of light emitting in the visible and low consumption initiators are actively sought both at industrial level and academic.

Therefore, there remains a need for the development of new initiator systems that trigger photopolymerization under mild conditions, for example using visible light.

DEFINITIONS

Figure 1:
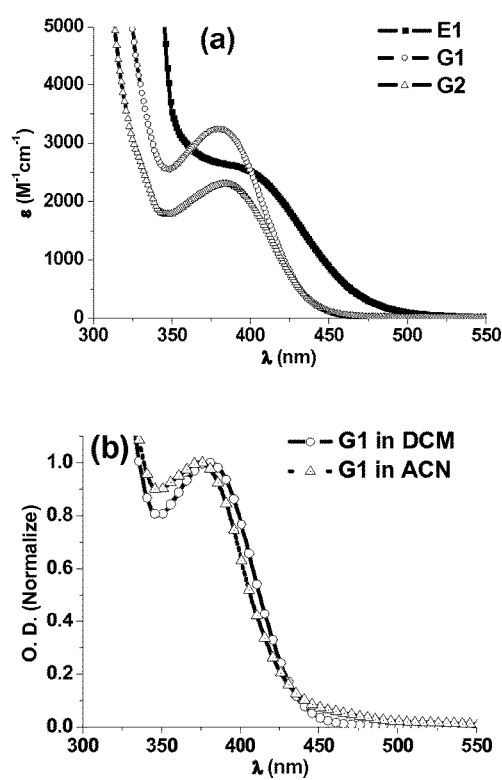
FIG. 1. (a) UV-vis absorption spectra of E1, G1 and G2 in dichloromethane and (b) UV-vis absorption spectra of G1 in dichloromethane (DCM) and acetonitrile (ACN).

To facilitate an understanding of the present invention, a number of terms and phrases are defined below:

In general, the term "substituted" whether preceded by the term "optionally" or not, and substituents contained in formulae of this invention, refer to the replacement of hydrogen radicals in a given structure with the radical of a specified substituent. When more than one position in any given structure may be substituted with more than one substituent selected from a specified group, the substituent may be either the same or different at every position. As used herein, the term "substituted" is contemplated to include all permissible substituents of organic compounds.

As used herein, the term "aliphatic", refers to alkyl, alkenyl and alkynyl moieties, as defined below.

As used herein, the term "alkyl", refers to straight and branched alkyl groups. An analogous convention applies to other generic terms such as "alkenyl", "alkynyl" and the like. In certain embodiments, as used herein, "lower alkyl" is used to indicate those alkyl groups (substituted, unsubstituted, branched or unbranched) having about 1-6 carbon atoms. Illustrative alkyl groups include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like, which again, may bear one or more substituents. Alkenyl groups include, but are not limited to, for example, ethenyl, propenyl, butenyl, 1-methyl-2-buten-1-yl, and the like. Representative alkynyl groups include, but are not limited to, ethynyl, 2-propynyl (propargyl), 1-propynyl and the like.

In general, the term "aromatic moiety" or "aryl", as used herein, refers to stable substituted or unsubstituted unsaturated mono- or polycyclic hydrocarbon moieties having preferably 3-14 carbon atoms, comprising at least one ring satisfying the Hückel rule for aromaticity. Examples of aromatic moieties include, but are not limited to, phenyl, indanyl, indenyl, naphthyl, phenanthryl and anthracyl.

As used herein, the term "alkylaryl" refers to an aryl moiety bearing at least one alkyl substituent, the alkylaryl moiety being bound to the rest of the molecule via any of the aryl ring atoms not already bearing a substituent. As an example, the term "C6-C14 alkylaryl" refers to an alkyl aryl moiety, as defined above, which contains a total of 6 to 14 carbon atoms between the alkyl and aryl groups. For example, a methylphenyl moiety is a C7alkylaryl. For example, "C6-C14 alkylaryl" encompasses C0-C4alkylC6-C10aryl moieties.

Similarly, the term "aralkyl" refers to an alkyl moiety bearing at least one aryl substituent, the aralkyl moiety being bound to the rest of the molecule via any of the alkyl chain atoms not already bearing a substituent. As an example, the term "C6-C14 aralkyl" refers to an aralkyl moiety, as defined above, which contains a total of 6 to 14 carbon atoms between the alkyl and aryl groups. For example, a phenylethyl moiety, which contains a total of 8 carbon atoms, is a C8aralkyl. For example, "C6-C14 aralkyl" encompasses C6-C10arylC0-C4alkyl moieties.

In general, the term "heteroaromatic moiety", "heteroaryl" or "heteroaryl", as used herein, refers to stable substituted or unsubstituted aromatic moieties, as defined above, having from about five to about ten ring atoms of which one ring atom is selected from S, O and N; zero, one or two ring atoms are additional heteroatoms independently selected from S, O and N; and the remaining ring atoms are carbon, the radical being joined to the rest of the molecule via any of the ring atoms, such as, for example, pyridyl, pyrazinyl, pyrimidinyl, pyrrolyl, pyrazolyl, imidazolyl, thiazolyl, oxazolyl, isooxazolyl, thiadiazolyl, oxadiazolyl, thiophenyl, furanyl, quinolinyl, isoquinolinyl, and the like.

As used herein, the term "silyl" refers to a —Si(R)$_3$ or —Si(R$_2$)— moiety wherein each occurrence of R is independently a C1-C6alkyl or C6-C10aryl moiety.

As used herein, the expression "C$_x$-C$_y$, preferably C$_{x1}$-C$_{y1}$, alkylaryl, aralkyl or aryl", where x, y, x1 and y1 represent integers denoting the number of carbon atoms in the chemical moiety to which it refers (e.g., "alkylaryl", "aralkyl", "aryl")), means "C$_x$-C$_y$alkylaryl, C$_x$-C$_y$aralkyl or C$_x$-C$_y$aryl, preferably C$_{x1}$-C$_{y1}$alkylaryl, C$_{x1}$-C$_{y1}$ aralkyl or C$_{x1}$-C$_{y1}$aryl". Likewise, the expression "C$_x$-C$_y$ alkylaryl, aralkyl or aryl", means "C$_x$-C$_y$alkylaryl, C$_x$-C$_y$aralkyl or C$_x$-C$_y$aryl".

DETAILED DESCRIPTION OF CERTAIN PREFERRED EMBODIMENTS OF THE INVENTION

As noted above, there has been increasing interest in recent years in the development of complex initiators that catalyze polymerization reactions under mild irradiation conditions, for example under visible light irradiation. Iridium and ruthenium complexes have been reported, that achieve this. However, these structures are expensive and difficult to synthesize and are therefore have a very limited scope of application; specifically, they are not suitable for industrial applications. Other attempts have been made with Ni, Zn, Fe, Cr, and Co complexes. But these attempts have failed. The inventors found that the field is completely unpredictable, because it is difficult to determine the correct combination of metal atom and ligands that will yield a photoinitiator complex with suitable properties for inducing photopolymerization under mild light irradiation, for example under visible light. Specifically, to be useful for such purpose, the resulting complex should have a balance of suitable properties, including:

Capacity to absorb light, preferably under mild irradiation conditions

Life-time of the excited state that is compatible with initiating free radical polymerization Suitable redox properties Reversibility of redox reaction Advantageously, the resulting complex may exhibit the following properties:

A capacity to absorb light in mild irradiation conditions such as in the 200-900 nm range; for example in the visible range 390-700 nm;

A life-time >10 ps;

Redox properties in the −2 to 2 V range;

Reversibility of redox reaction better than 50%.

The inventors have discovered that copper with a proper selection of ligands, can form complexes that have the required aforementioned properties suitable to serve as photoinitiator of free radical photopolymerization; in addition to free radical promoted cationic photopolymerization when used in conjunction with a proper vinyl cation initiator.

In this context, there is provided herein a novel photopolymerization method for free radical and/or cationic polymerization under mild light irradiation, for example under visible light irradiation, further employing a novel catalyst species. According to the present invention, in one aspect, there is provided a method for effecting free radical and/or cationic photopolymerisation under mild light irradiation conditions, for example under visible light irradiation, comprising the step of polymerizing at least one polymerisable component selected from the group consisting of:

(i) an ethylenically unsaturated monomer, the polymerization of which may be effected by free radical polymerization; and/or (ii) an ethylenically unsaturated monomer or an epoxy-containing monomer; the polymerization of which may be effected by cationic polymerization;

in the presence of:

A) mild light irradiation; preferably in the λ=200-900 nm range, for example in the visible range λ=390-700 nm;

B) an initiator complex of formula I or II

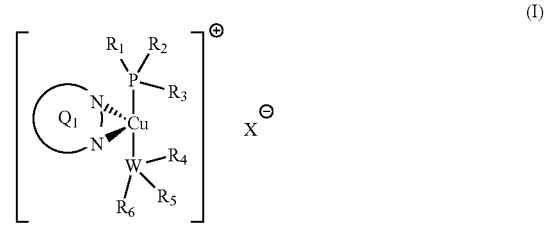

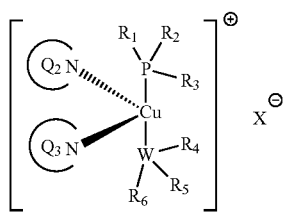

wherein

Q₁ represents a conjugated polyaromatic system containing two nitrogen atoms whose lone pair of electrons forms a bond with the copper atom;

Q₂ and Q₃ independently represent a conjugated polyaromatic system containing one nitrogen atom whose lone pair of electrons forms a bond with the copper atom;

W represents a phosphorus or nitrogen atom;

$R_1$, $R_2$, $R_3$, $R_4$, $R_5$ and $R_6$ each independently represents an aliphatic or aromatic moiety, preferably $C_{6-20}$ alkyl or $C_{6-10}$ aryl moiety; wherein the alkyl and/or the aryl moieties may be, individually, further substituted with one or more linear or branched $C_{1-6}$ alkyl or $C_{6-10}$ aryl moieties; and wherein $R_3$ and $R_4$, together with the P, Cu and W atoms, may form a 6- to 8-membered ring;

X represents a suitable counterion; preferably $BF_4^-$, $PF_6^-$, $SbF_6^-$ or $Cl^-$;

C) an iodonium salt of formula $(R^A)_2I^+$; wherein each occurrence of $R^A$ independently represents a $C_{6-10}$ aryl moiety; wherein the aryl moiety may be, individually, further substituted with one or more aliphatic or aromatic moiety, preferably one or more linear or branched $C_{1-6}$ alkyl or $C_{6-10}$ aryl moieties;

and provided that, when at least one polymerisable component is an ethylenically unsaturated monomer or an epoxy-containing monomer; whose polymerization is effected by cationic polymerization, the photopolymerisation method is additionally carried out in presence of :

D) a vinyl cation initiator having the structure III or IV:

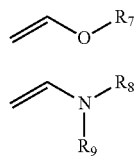

wherein $R_7$ represents a linear or branched $C_{1-6}$alkyl or $C_{1-10}$heteroalkenyl moiety or a $C_{6-10}$aryl moiety; and $R_8$ and $R_9$ independently represent a linear or branched $C_{1-6}$alkyl moiety or a $C_{6-10}$aryl moiety; where $R_8$ and $R_9$ together may form a cyclic heteroaryl moiety.

As the reader will understand, depending on the type of monomer(s) used (i.e., whether the monomer polymerizes according to a free radical mechanism, or a cationic mechanism), and depending on the use or not of a vinyl cation initiator D) in combination with the copper photoinitiator B) and iodonium salt C), the photopolymerization method according to the invention may achieve:

free radical photopolymerization
cationic photopolymerization; or
both free radical and cationic polymerization.

In other words, the vinyl cation initiator D) is optional, and may be used if cationic photopolymerization is desired. As such, the photopolymerization method according to the invention may comprise A), B) and C), as defined above, and in variants below. In addition, the photopolymerization method according to the invention may comprise A), B), C) and D), as defined above, and in variants below.

Advantageously, when D) is used, the photopolymerization method further comprises, in combination with the vinyl cation initiator having the structure III or IV, a silane moiety of formula $(R^B)_3SiH$; wherein each occurrence of $R^B$ independently represents —$SiR_3$ wherein each occurrence of R independently represents a linear or branched $C_{1-6}$alkyl moiety.

a) Polymerizable Component

Advantageously, the polymerizable component may be an ethylenically unsaturated monomer, the polymerization of which may be effected by free radical polymerization. As used herein, the term "ethylenically unsaturated monomer" refers to a monomer that contains at least one carbon-carbon double bond. Preferably, ethylenically unsaturated monomers whose polymerization may be effected by free radical polymerization, contains at least one carbon-carbon double bond that is conjugated with an aryl moiety (e.g., phenyl), a carboxyl (C=O) group, or another double bond. Such monomers in this category include for example acrylates —[(ROCO)CHCH₂]— (acrylic acid, methyl acrylate, ethyl acrylate, butyl acrylate, etc. . . . ), methacrylates —[(ROCO)C(Me)CH₂]— (methacrylic acid, methyl methacrylic acid, etc. . . . ), styrene, ethylene, propylene, N-vinyl acrylamide, N-vinylpyrolidone. For example, the polymerizable component may be trimethylolpropane triacrylate (TMPTA):

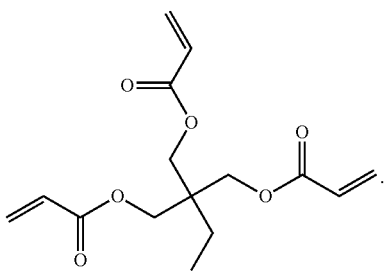 [SMILES: C=CC(=O)OCC(CC)(COC(=O)C=C)COC(=O)C=C]

Advantageously, the polymerizable component may be an ethylenically unsaturated monomer or an epoxy-containing monomer whose polymerization may be effected by cationic polymerization. Examples of these monomers include vinyl ethers —[ROCHCH₂]— such as vinyl methyl ether, vinyl ethyl ether, vinyl isobutyl ether; and epoxy monomers. As used herein, the term "epoxy monomer" refers to a moiety comprising an oxirane moiety having the structure:

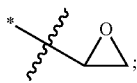

wherein "*" denotes the point of attachment of the oxirane moiety to the rest of the monomer. For example, the polymerizable component may be the epoxide monomer (EPOX) having the following structure:

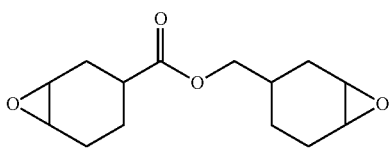 [SMILES: O=C(OCC1CCC2OC2C1)C1CCC2OC2C1]

Advantageously, the polymerizable component may be a mixture of two or more components which are polymerizable via different polymerization mechanisms: free radical polymerization or cationic polymerization, respectively. For example, the polymerizable component may be a mixture of TMPTA and EPOX. Other examples include mixtures vinylether/acrylate and vinylether/epoxy.

One important advantage of the copper photoinitiator complexes described herein is twofold: (i) they generate free radicals under very mild irradiation conditions (e.g., λ=200-900 nm, for example under the visible light range λ=390-700 nm), and (ii) they undergo a photoredox catalytic cycle that initiates free radical promoted cationic photopolymerization, when combined with a suitable cationic vinyl initiator. Accordingly, the use of the copper photoinitiator complexes of the invention under mild light irradiation conditions allow concomitant free radical and cationic polymerizations when a mixture of monomers with these distinct polymerization mechanisms is used. This allows the preparation of interpenetrated networks of polymers that have different polymerization mechanisms (free radical and cationic), with a single photoinitiator. This is a striking advantage, as compared to existing methods, which require the use of two different polymerization initiators: a photoinitiator for the free radical polymerization, and a cationic initiator for the cationic polymerization. Necessarily, the use of two different initiators, means different initiating times, and thus polymerizations that may go at different speed and/or with different efficiencies, thereby leading to interpenetrated polymer networks far less homogeneous than those obtainable by the photopolymerization method of the invention.

b) Mild Light Irradiation

As used herein, the term "mild light irradiation" refers to the visible and middle-to-near UV spectrum, ranging from 200-900 nm in wavelengths.

Advantageously, the mild light irradiation may be provided by a source of visible light.

Advantageously, any source of visible light may be used to carry out the photopolymerization method according to the invention. By visible light is meant the visible spectrum in the wavelengths from about 390 to 700 nm. For example, light emitted from LED bulbs, laser diode, green fluorescence bulbs, halogen lamps, household lamps including energy-saving lamps, or natural light may be used.

Advantageously, the mild light irradiation may be provided by a source of middle-to-near UV light. Advantageously, any source of middle-to-near UV light may be used to carry out the photopolymerization method according to the invention. By middle-to-near UV light is meant the light spectrum in the wavelengths from about 200 to 390 nm. For example, light emitted from BLB type lamps, Mercury-vapor lamps, Sodium vapor lamps or Xenon arc lamps may be used.

An important advantage of the invention is that photopolymerization can be effected under very mild irradiation conditions. For example, a simple household halogen lamp may be used.

c) Initiator Complex

Advantageously, in the initiator complex of formula I: $Q_1$ may have the formula:

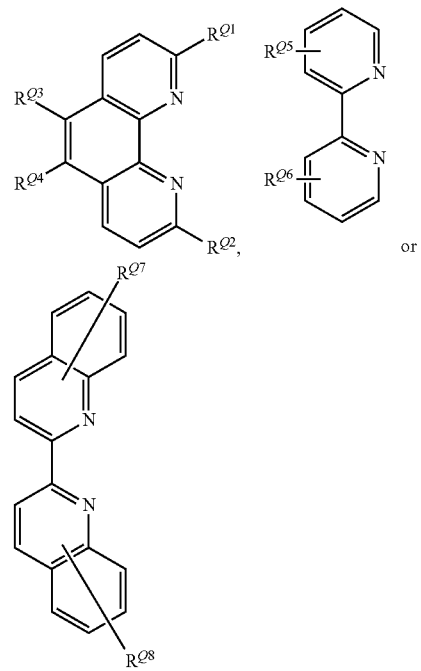

wherein
$R^{Q1}$ and $R^{Q2}$ independently represent H or a linear or branched $C_{1-6}$alkyl moiety;
$R^{Q3}$ and $R^{Q4}$ independently represent H or —$NR^C R^D$ wherein $R^C$ and $R^D$ independently represent a linear or branched $C_{1-6}$alkyl moiety or a $C_{6-10}$aryl moiety; where $R^C$ and $R^D$ together may form a 5- or 6-membered heterocyclic moiety wherein the heterocyclic moiety may be further substituted with —CN, a linear or branched $C_{1-6}$alkyl moiety, a $C_{6-10}$aryl or $C_{6-12}$heteroaryl moiety;
$R^{Q5}$ and $R^{Q6}$ independently represent H or a linear or branched $C_{1-10}$alkyl moiety; wherein the alkyl moieties may be independently further substituted with —$NR^E R^F$ wherein $R^E$ and $R^F$ independently represent a linear or branched $C_{1-6}$alkyl moiety or a $C_{6-10}$aryl moiety, or wherein $R^E$ and $R^F$ together with the nitrogen atom to which they are attached form a mono- or polycyclic $C_{6-12}$heterocyclic moiety;
$R^{Q7}$ and $R^{Q8}$ independently represent H, a linear or branched $C_{1-6}$alkyl moiety or a $C_{6-10}$aryl moiety.

Advantageously, in the initiator complex of formula I, Q1 is a fused polycyclic heteroaryl moiety having the formula:

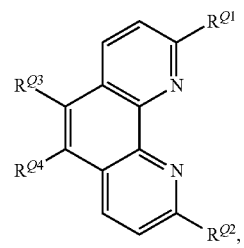

wherein
$R^{Q1}$ and $R^{Q2}$ independently represent H or a linear or branched $C_{1-6}$alkyl moiety; and
$R^{Q3}$ and $R^{Q4}$ independently represent H or —$NR^CR^D$ wherein $R^C$ and $R^D$ independently represent a linear or branched $C_{1-6}$alkyl moiety or a $C_{6-10}$aryl moiety; where $R^C$ and $R^D$ together may form a 5- or 6-membered heterocyclic moiety wherein the heterocyclic moiety may be further substituted with —CN, a linear or branched $C_{1-6}$alkyl moiety, a $C_{6-10}$aryl or $C_{6-12}$heteroaryl moiety.

Advantageously, in the initiator complex of formula II:
$Q_2$ and $Q_3$ independently may have the formula:

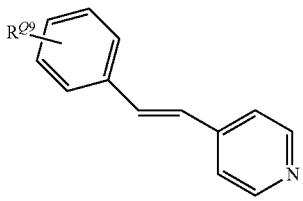

wherein $R^{Q9}$ represents H or —$NR^GR^H$ wherein $R^G$ and $R^H$ independently represent a linear or branched $C_{1-6}$alkyl moiety or a $C_{6-10}$aryl moiety.

Advantageously, the initiator complex may have formula $I^A$ or $II^A$:

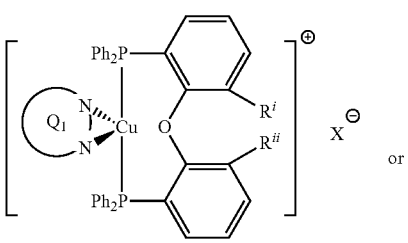

wherein $Q_1$, $Q_2$ and $Q_3$ are as defined above; and $R^i$ and $R^{ii}$ independently represent H or a linear or branched $C_{1-6}$alkyl moiety.

Advantageously, the initiator complex may have formula $I^B$ or $II^B$:

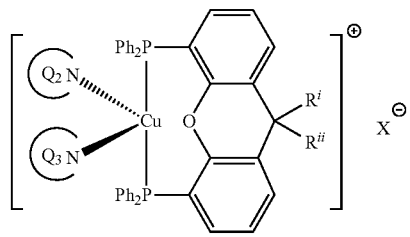

wherein $Q_1$, $Q_2$ and $Q_3$ are as defined above; and $R^i$ and $R^{ii}$ independently represent H or a linear or branched $C_{1-6}$alkyl moiety.

Advantageously, the initiator complex may have formula $I^C$:

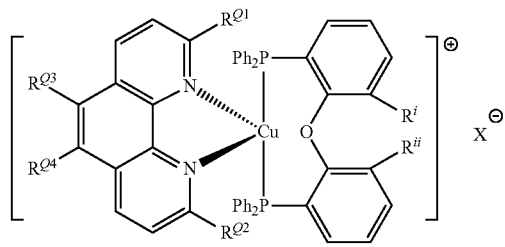

wherein
$R^{Q1}$ and $R^{Q2}$ independently represent H or a linear or branched $C_{1-6}$alkyl moiety;
$R^{Q3}$ and $R^{Q4}$ independently represent H or —$NR^CR^D$ wherein $R^C$ and $R^D$ independently represent a linear or branched $C_{1-6}$alkyl moiety or a $C_{6-10}$aryl moiety; where $R^C$ and $R^D$ together may form a 5- or 6-membered heterocyclic moiety wherein the heterocyclic moiety may be further substituted with linear or branched $C_{1-6}$alkyl moiety or a $C_{6-10}$aryl or $C_{6-12}$heteroaryl moiety; and
$R^i$ and $R^{ii}$ independently represent H or a linear or branched $C_{1-6}$alkyl moiety.

Advantageously, the initiator complex may have formula $I^D$:

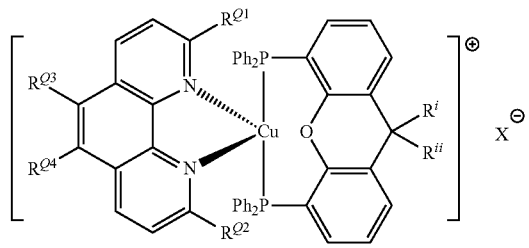

wherein
$R^{Q1}$ and $R^{Q2}$ independently represent H or a linear or branched $C_{1-6}$alkyl moiety;
$R^{Q3}$ and $R^{Q4}$ independently represent H or —$NR^CR^D$ wherein $R^C$ and $R^D$ independently represent a linear or branched $C_{1-6}$alkyl moiety or a $C_{6-10}$aryl moiety; where $R^C$ and $R^D$ together may form a 5- or 6-membered heterocyclic moiety wherein the heterocyclic moiety may be further substituted with linear or branched $C_{1-6}$alkyl moiety or a $C_{6-10}$aryl or $C_{6-12}$heteroaryl moiety; and $R^i$ and $R^{ii}$ independently represent H or a linear or branched $C_{1-6}$alkyl moiety.

Advantageously, the initiator complex may have one of the following structures:

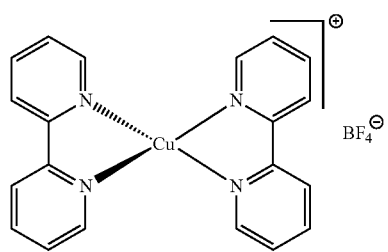

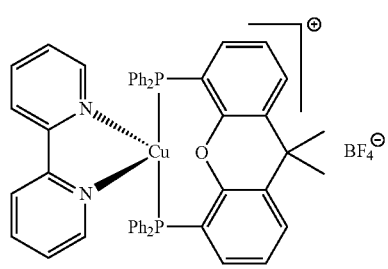

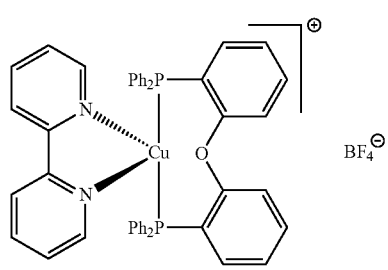

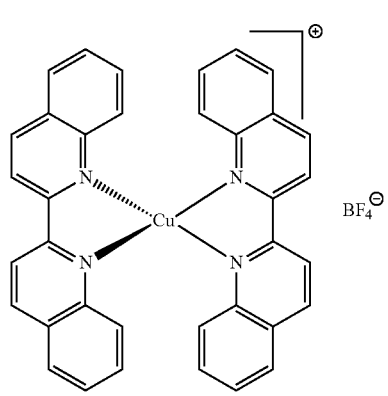

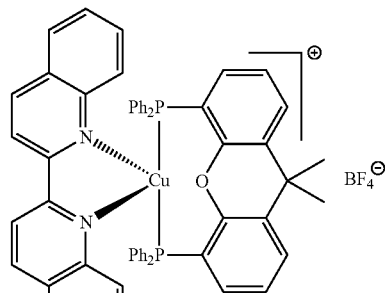

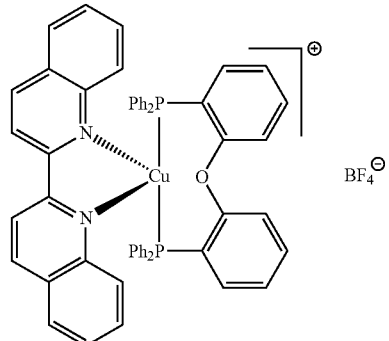

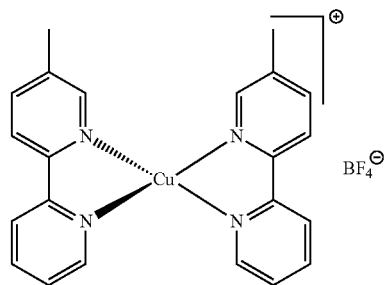

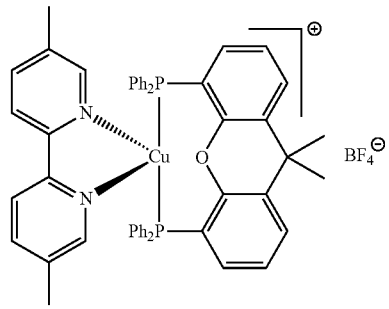

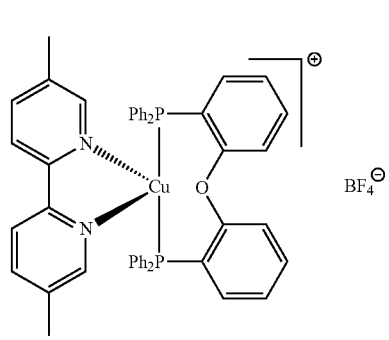

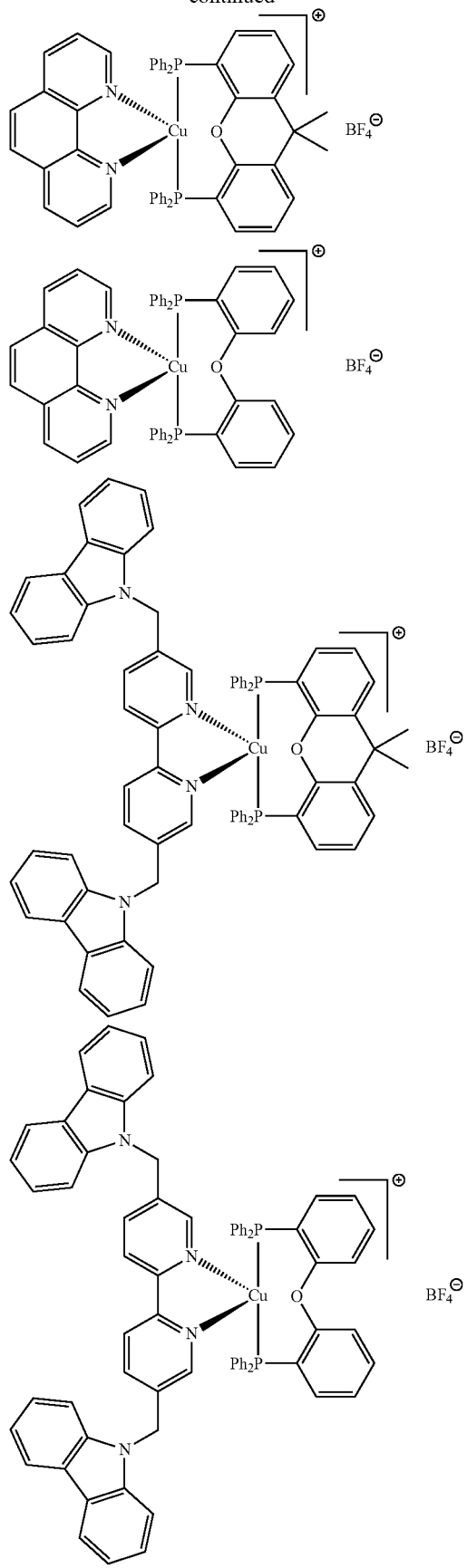
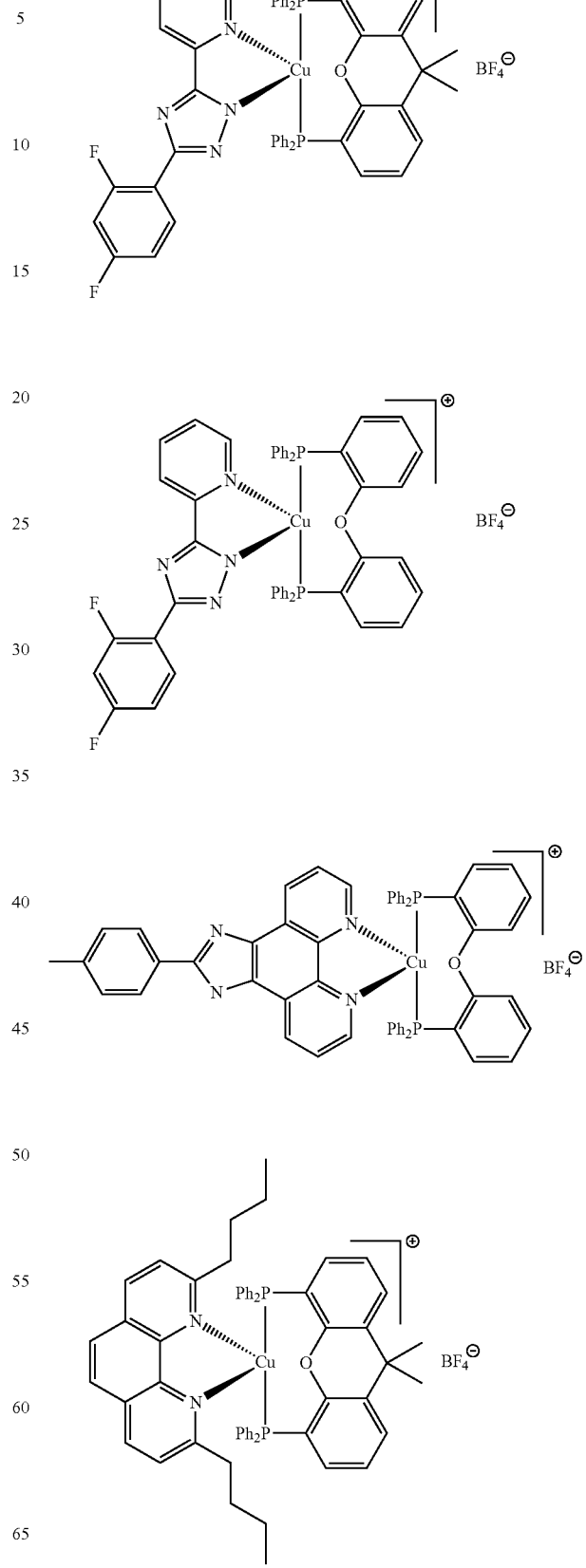

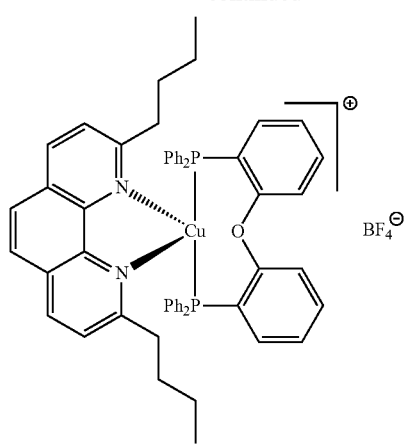
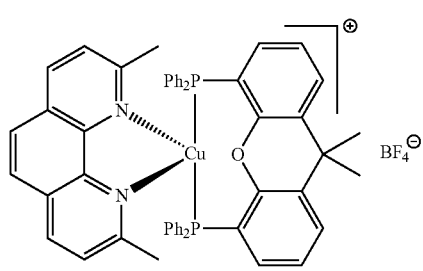
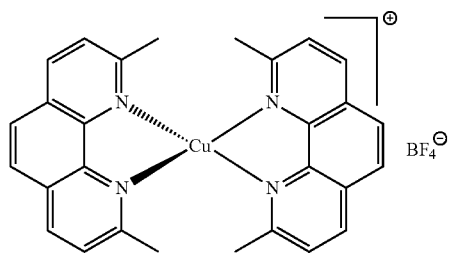
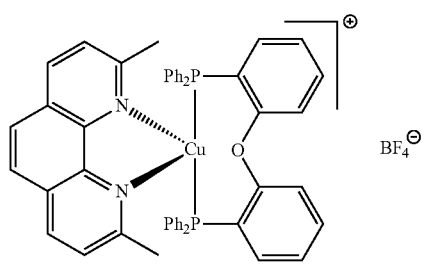
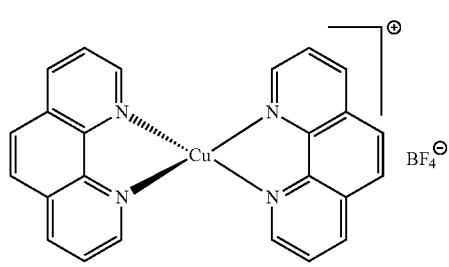
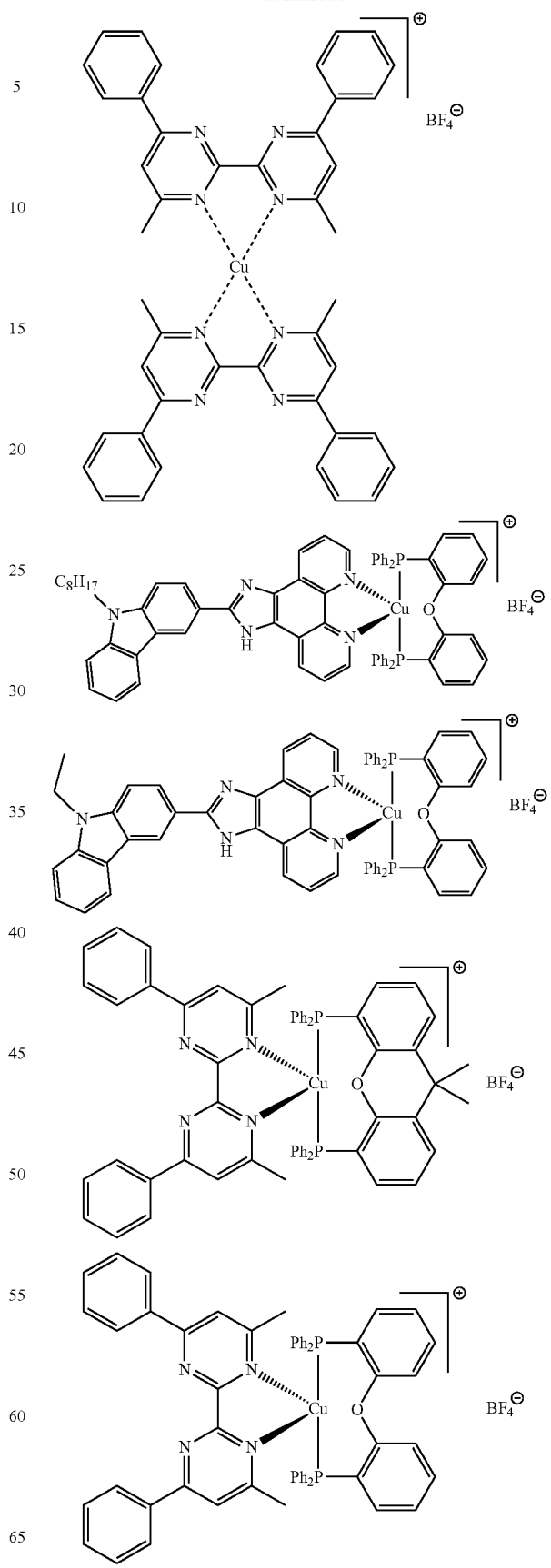

-continued
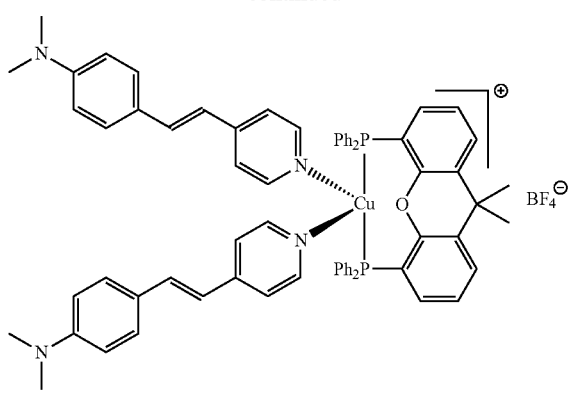
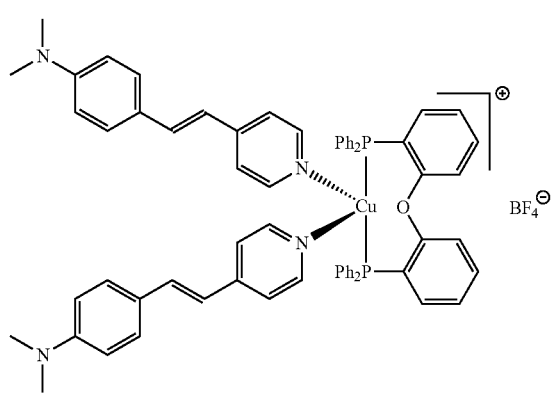
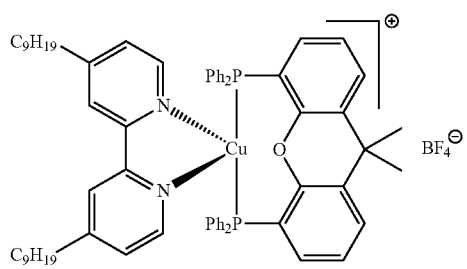
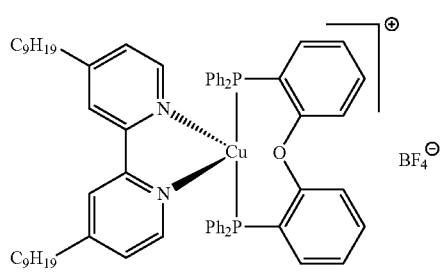
-continued
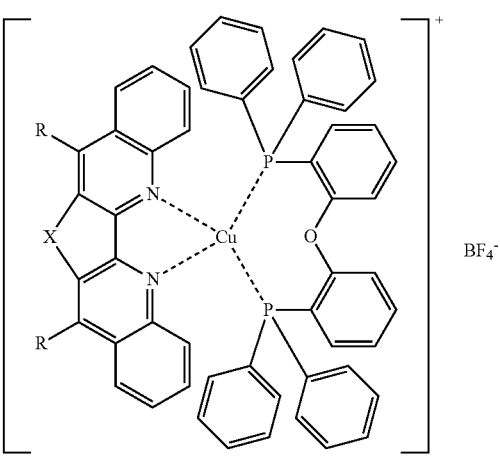
1b  R = H, X = H, H
2b  R = C$_6$H$_5$, X = H, H
3b  R = C$_6$H$_5$, X = CH$_2$
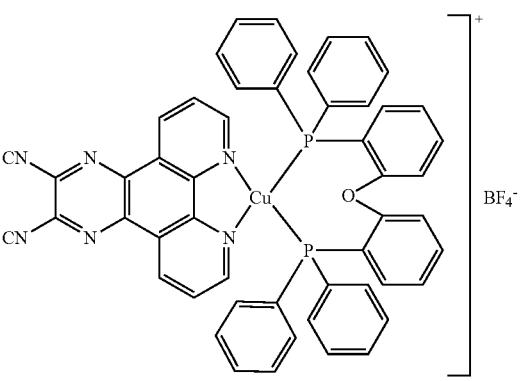
[Cu(POP)(ECl-Phen)]BF$_4$
In complexes 1b and 2b above, <<X=H,H>> means that the corresponding positions on the quinolinyl groups are unsubstituted.

-continued

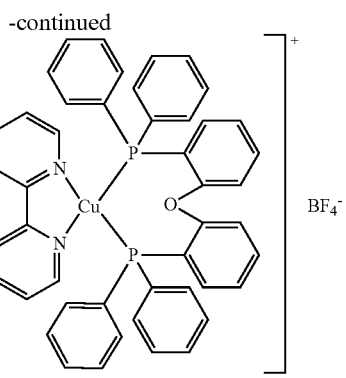

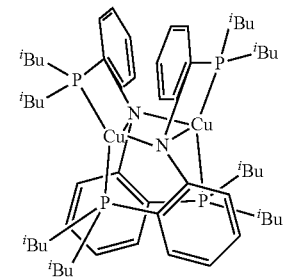

Preferably, the initiator complex may have one of the following structures:

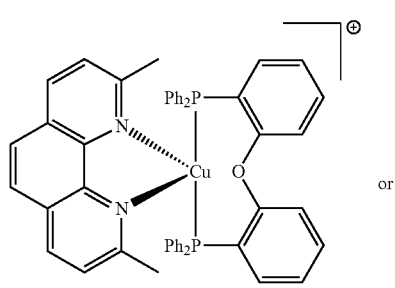

or

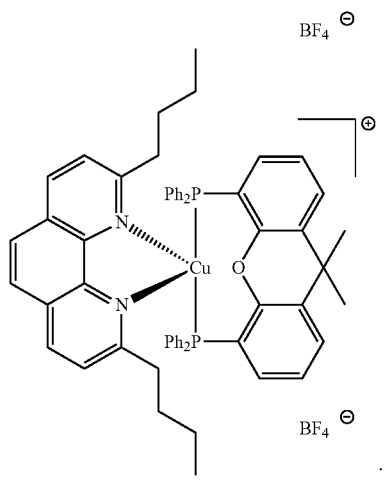

Advantageously, in the initiator complex of formula I or II, the counterion $X^-$ may represent $BF_4^-$, $PF_6^-$, $SbF_6^-$ or $Cl^-$.

d) Iodonium Salt

Advantageously, in the iodonium salt of formula $(R^A)_2I^+$, each occurrence of $R^A$ independently represents a phenyl moiety; wherein the phenyl moiety may be, individually, further substituted with one or more linear or branched $C_{1-6}$alkyl moieties. For example, the phenyl moiety may bear methyl, ethyl, n-propyl, i-propyl, t-butyl groups, preferably in ortho position relative to the iodine atom.

Advantageously, the counterion of the iodonium salt of formula $(R^A)_2I^+$ may be any suitable negatively charged counterion. For example, it may be $B(PhF_6)_4^-$, $PF_6^-$, $SbF_6^-$ or $Cl^-$.

Advantageously, the iodonium salt may have one of the following structures:

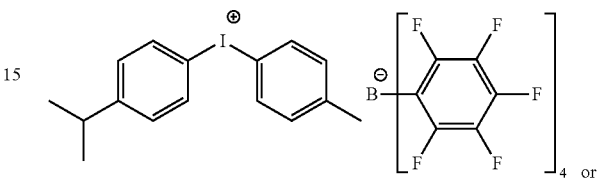

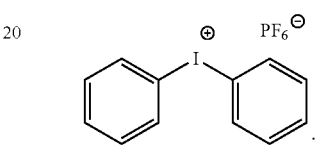

e) Vinyl Cation Initiator

Advantageously, the vinyl cation initiator may have formula III

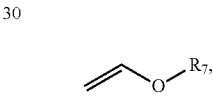

wherein $R_7$ may represent —($CH_2$—$CH_2$)—O—($CH_2$—$CH_2$)—O—($CH_2$—$CH_2$)—O—CH=$CH_2$ (i.e., the vinyl cation initiator may be triethyleneglycol divinyl ether).

Advantageously, the vinyl cation initiator may have formula IV

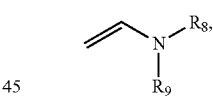

wherein $R_8$ and $R_9$ together may form a cyclic heteroaryl moiety. For example, the vinyl cation initiator has the following structure:

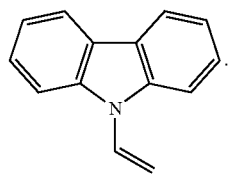

Advantageously, the vinyl cation initiator of formula III or IV may be used in combination with a silane moiety of formula $(R^B)_3SiH$; wherein each occurrence of $R^B$ independently represents —$SiR_3$ wherein each occurrence of R independently represents a linear or branched $C_{1-6}$alkyl moiety. For example, the silane moiety may have the following structure:

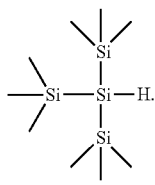

f) Polymer

In another aspect, there is provided a polymer material obtainable by the photopolymerization method according to the present invention. The variants described above for the various components for the photopolymerization method are applicable mutadis mutandis to this section, and will be understood to apply to the definition of the polymer material(s) obtained by the method of the invention.

Advantageously, the polymer material may be obtained by photopolymerizing at least in part an ethylenically unsaturated monomer whose polymerization is effected by free radical polymerization, and an ethylenically unsaturated monomer or an epoxy-containing monomer whose polymerization is effected by cationic polymerization, according to the mild-light induced photopolymerization according to the invention; to form an interpenetrated network of polymers generated by concomitant free radical and cationic polymerizations.

g) Liquid Compositions

In another aspect, there is provided liquid composition, curable by exposure to mild light irradiation; preferably in the $\lambda$=200-900 nm range, for example in the visible range $\lambda$=390-700 nm; containing:

(a) at least one polymerisable component selected from the group consisting of:
  (b) an ethylenically unsaturated monomer, the polymerization of which may be effected by free radical polymerization; and/or
  (ii) an ethylenically unsaturated monomer or an epoxy-containing monomer; the polymerization of which may be effected by cationic polymerization;
(b) a photoinitiator complex of formula I or II:

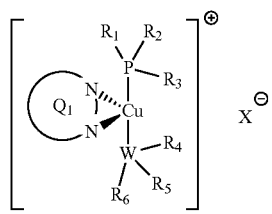

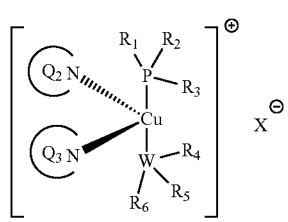

wherein
  $Q_1$ represents a conjugated polyaromatic system containing two nitrogen atoms whose lone pair of electrons forms a bond with the copper atom;
  $Q_2$ and $Q_3$ independently represent a conjugated polyaromatic system containing one nitrogen atom whose lone pair of electrons forms a bond with the copper atom;
  W represents a phosphorus or nitrogen atom;
  $R_1$, $R_2$, $R_3$, $R_4$, $R_5$ and $R_6$ each independently represents a $C_{6-20}$ alkyl or $C_{6-10}$ aryl moiety; wherein the alkyl and/or the aryl moieties may be, individually, further substituted with one or more linear or branched $C_{1-6}$alkyl moieties; and wherein $R_3$ and $R_4$, together with the P, Cu and W atoms, may form a 6- to 8-membered ring;
  X represents a suitable counterion; preferably $BF_4^-$, $PF_6^-$, $SbF_6^-$ or $Cl^-$;

(c) an iodonium salt of formula $(R^A)_2I^+$; wherein each occurrence of $R^A$ independently represents a $C_{6-10}$aryl moiety; wherein the aryl moiety may be, individually, further substituted with one or more linear or branched $C_{1-6}$alkyl moieties; and provided that, (d) when at least one polymerisable component (a) is an ethylenically unsaturated monomer or an epoxy-containing monomer; the polymerization of which may be effected by cationic polymerization, the liquid composition further comprises a vinyl cation initiator having the structure III or IV:

wherein $R_7$, $R_8$ and $R_9$ independently represent a linear or branched $C_{1-6}$alkyl moiety or a $C_{6-10}$aryl moiety; where $R_8$ and $R_9$ together may form a cyclic heteroaryl moiety.

The variants described above for the various components for the photopolymerization method are applicable mutadis mutandis to this section, and will be understood to apply to the definition of the liquid composition defined above.

Advantageously, the liquid composition may further comprise, in combination with the vinyl cation initiator having the structure III or IV, a silane moiety of formula $(R^B)_3SiH$; wherein each occurrence of $R^B$ independently represents —$SiR_3$ wherein each occurrence of R independently represents a linear or branched $C_{1-6}$alkyl moiety.

h) Uses

In another aspect, there is provided the use of a copper complex of formula I or II as initiator for free radical photopolymerisation or cationic photopolymerisation under mild light irradiation conditions (preferably in the 200-900 nm range), for example under visible light irradiation (preferably in the 390-700 nm range).

In another aspect, there is provided the use of a copper complex of formula I or II for the preparation of an interpenetrated network of at least two polymers whose polymerization is effected by free radical photopolymerization and cationic photopolymerization, respectively, under mild light irradiation conditions (preferably in the $\lambda$=200-900 nm range), for example under visible light irradiation (preferably in the λ=390-700 nm range).

Likewise, the variants described above for the various components for the photopolymerization method are applicable mutadis mutandis to this section, and will be understood to apply to the definition of the uses defined above.

i) Synthetic Methods

The practitioner has a well-established literature of ligand and heterocyclic chemistry to draw upon, in combination with the information contained herein, for guidance on synthetic strategies, protecting groups, and other materials and methods useful for the synthesis of the copper complexes of this invention. For example, the reader may refer to the Exemplification section below, and references cited therein for synthetic approaches suitable for the preparation of some of the ligands described herein. In addition, the reader may refer to ref 41-45 for synthetic approaches to specific copper complexes suitable for carrying out the present invention.

The synthesis of the copper complexes according to the invention is straightforward: it involves reacting a suitable copper starting material, with the proper ligands in equimolar ratios.

For examples, copper initiator complexes of formula I may be prepared according to the general scheme below:

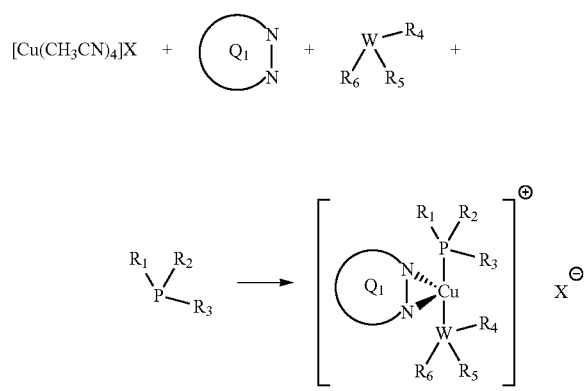

Similarly, copper initiator complexes of formula II may be prepared according to the general scheme below:

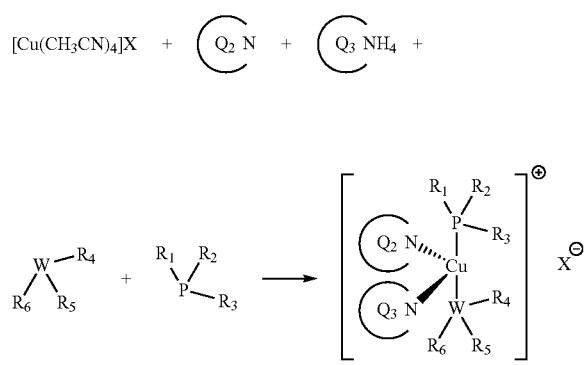

EQUIVALENTS

The representative examples that follow are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples which follow and the references to the scientific and patent literature cited herein. It should further be appreciated that the contents of those cited references are incorporated herein by reference to help illustrate the state of the art.

The following examples contain important additional information, exemplification and guidance that can be adapted to the practice of this invention in its various embodiments and the equivalents thereof.

EXEMPLIFICATION

The complexes of this invention, their preparation and uses in mild-light induced photopolymerization reactions can be understood further by the examples that illustrate some of the processes by which these compounds are prepared or used. It will be appreciated, however, that these examples do not limit the invention. Variations of the invention, now known or further developed, are considered to fall within the scope of the present invention as described herein and as hereinafter claimed.

Summary:

Metal complexes e.g. ruthenium [1, 2] or iridium [3-8] complexes have been successfully used in photoinitiating systems (PISs) [9] for polymer synthesis as they possess excellent photochemical properties (e.g. intense visible light absorption, long lived excited states and suitable redox potentials) and can work through either an oxidation or a reduction cycle to produce reactive species e.g. radicals or cations. [10-15] Recently, copper complexes are attracting increasing attentions in the photopolymerization area due to their comparative cost advantage. Copper complexes with suitable ligands exhibit long excited-state lifetimes [16] when subjected to intense light radiation (outside of the visible range and middle-to-near UV range) which could endow them with potential for various applications such as organic light-emitting diode (OLED) [17-19] or light mediated photochemical reactions. [20-23] Interestingly, copper complexes have been reported for the light induced atom transfer radical polymerization (ATRP) in the presence [24, 25] or absence of common organic photoinitiators or dyes. [26, 27] But again, it involved intense light radiation, beyond the visible range and middle-to-near UV range. However, to the best of our knowledge, no attempt has been made to use copper complexes in the PISs for both cationic and radical photopolymerizations under mild light irradiations.

In what follows, three copper complexes have been incorporated into PISs (containing iodonium salt and optionally another additive) to photochemically generate reactive species (i.e. radicals and cations) which have been studied using cyclic voltammetry, electron spin resonance spin trapping, steady state photolysis, and laser flash photolysis techniques. The photoinitiation ability of the copper complexes based PISs for the radical or cationic photopolymerization has been investigated and compared to the reference camphorquinone (CQ) based PISs.

The investigated copper complexes (E1, G1 and G2) and other chemical compounds are shown in Schemes 1 and 2.

Scheme 1. Chemical structures of the studied copper complexes (E1, G1 and G2).

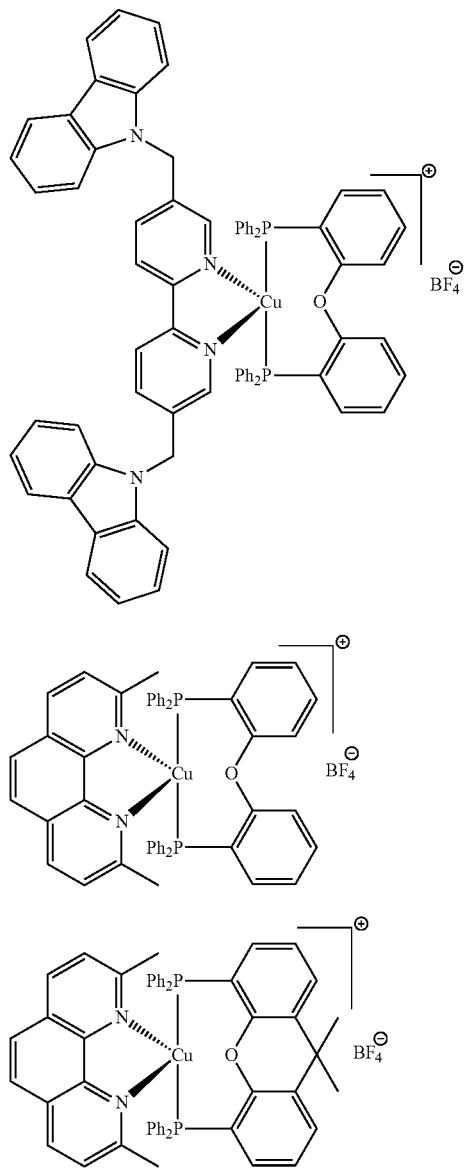

Materials and Methods

All reagents and solvents were purchased from Aldrich or Alfa Aesar and used as received without any further purification. Mass spectroscopy was performed by the Spectropole of Aix-Marseille University. ESI mass spectral analyses were recorded with a 3200 QTRAP (Applied Biosystems SCIEX) mass spectrometer. The HRMS mass spectral analysis was performed with a QStar Elite (Applied Biosystems SCIEX) mass spectrometer. Elemental analyses were recorded with a Thermo Finnigan EA 1112 elemental analysis apparatus driven by the Eager 300 software. $^1H$ and $^{13}C$ NMR spectra were determined at room temperature in 5 mm o.d. tubes on a Bruker Avance 400 spectrometer of the Spectropole: $^1H$ (400 MHz) and $^{13}C$ (100 MHz). The $^1H$ chemical shifts were referenced to the solvent peak DMSO-$d_6$ (2.49 ppm) and the $^{13}C$ chemical shifts were referenced to the solvent peak DMSO-$d_6$ (39.5 ppm). Complexes G1 and G2 were prepared by adapting a literature procedure. [33]

[Methyl-4-phenyl(methyl-1-ethyl)-4-phenyl] iodonium tetrakis (penta fluorophenyl) borate (Iod1) [28, 29] was obtained from Bluestar Silicones-France. Diphenyliodonium hexafluorophosphate (Iod2), tris(trimethylsilyl)silane ((TMS)$_3$Si—H), N-vinylcarbazole (NVK) and solvents were purchased from Sigma-Aldrich or Alfa Aesar and used as received without further purification. Trimethylolpropane triacrylate (TMPTA) and (3,4-epoxycyclohexane)methyl 3,4-epoxycyclohexylcarboxylate (EPOX) were obtained from Cytec and used as benchmark monomers for radical and cationic photopolymerization.

Scheme 2. Chemical structures of additives and monomers.

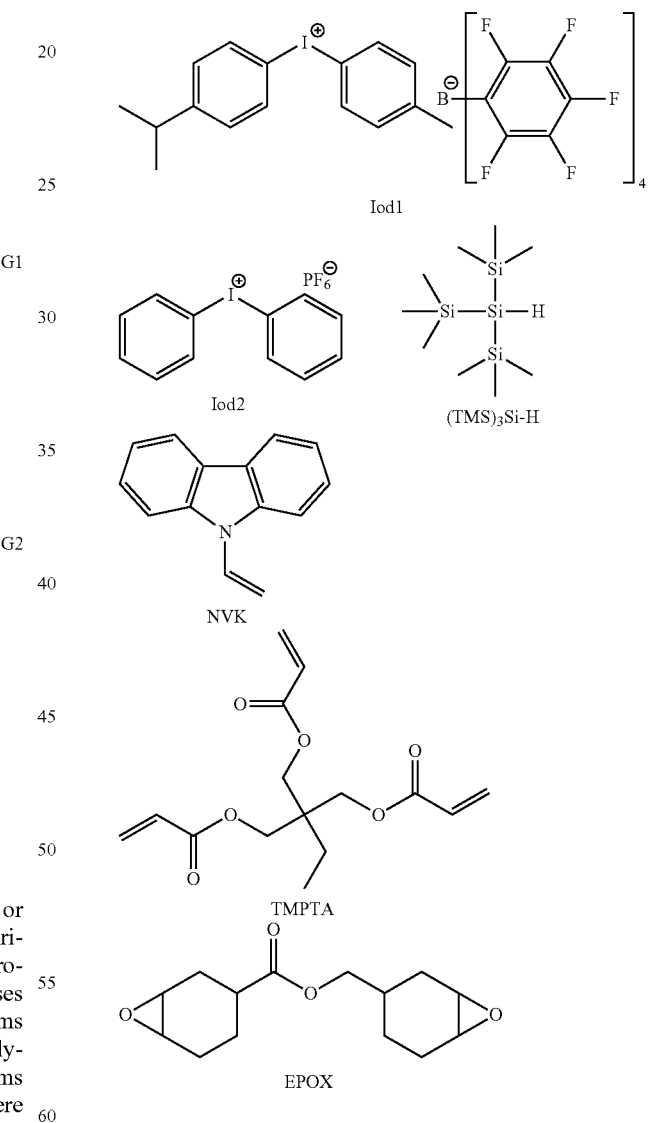

Irradiation Sources

Figure 11:
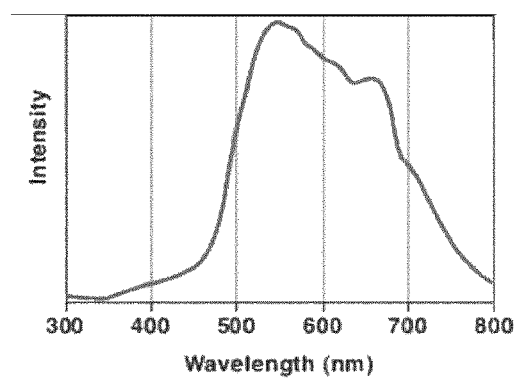
FIG. 11. The emission spectrum of the halogen lamp.

Different visible lights were used for the irradiation of photocurable samples: polychromatic light from the halogen lamp (Fiber-Lite, DC-950; incident light intensity: ~12 mW cm$^{-2}$ in the 370-800 nm range), purple laser diode at 405 nm (~8 mW cm$^{-2}$) or blue laser diode at 457 nm (~80 mW cm$^{-2}$). LEDs at 405 or 455 nm were also used (Thorlabs; ~80 mW cm$^{-2}$). The emission spectrum of the halogen lamp is provided in FIG. 11.

Redox Potentials

The oxidation potentials ($E_{ox}$ vs SCE) of the studied copper complexes were measured in acetonitrile by cyclic voltammetry with tetrabutylammonium hexafluorophosphate (0.1 M) as a supporting electrolyte (Voltalab 6 Radiometer). The working electrode was a platinum disk and the reference electrode was a saturated calomel electrode (SCE). Ferrocene was used as a standard, and the potentials determined from the half peak potential were referred to the reversible formal potential of this compound (+0.44 V/SCE). The free energy change ΔG for an electron transfer between the studied copper complexes and iodonium salt can be calculated from the classical Rehm-Weller equation: $\Delta G=E_{ox}-E_{red}-E_S+C$; where $E_{ox}$, $E_{red}$, $E_S$, and C are the oxidation potential of the studied copper complexes, the reduction potential of iodonium salt, the excited state energy of the studied copper complexes, and the electrostatic interaction energy for the initially formed ion pair, generally considered as negligible in polar solvents. [30]

ESR Spin Trapping (ESR-ST) Experiment

ESR-ST experiment was carried out using an X-Band spectrometer (MS 400 Magnettech). The radicals were generated at room temperature upon the halogen lamp exposure under N$_2$ and trapped by phenyl-N-tert-butylnitrone (PBN) according to a procedure [31] described elsewhere in detail. The ESR spectra simulations were carried out using the WINSIM software.

Steady State Photolysis Experiments

The copper complex (and optionally iodonium salt) solutions were irradiated with the laser diode at 405 nm, and the UV-vis spectra were recorded using a JASCO V-530 UV/vis spectrophotometer at different irradiation time.

Laser Flash Photolysis

Nanosecond laser flash photolysis (LFP) experiments were carried out using a Q-switched nanosecond Nd/YAG laser ($\lambda_{exc}$=355 nm, 9 ns pulses; energy reduced down to 10 mJ) from Continuum (Minilite) and an analyzing system consisted of a ceramic xenon lamp, a monochromator, a fast photomultiplier and a transient digitizer (Luzchem LFP 212). [2]

Photopolymerization Experiments

For photopolymerization experiments, the conditions are given in the figure captions. The photosensitive formulations were deposited on a BaF$_2$ pellet under air or in laminate (25 μm thick) for irradiation with different lights. The evolution of the double bond content of TMPTA and the epoxy group content of EPOX were continuously followed by real time FTIR spectroscopy (JASCO FTIR 4100) [8, 32] at about 1630 cm$^{-1}$ and 790 cm$^{-1}$, respectively.

The investigated copper complexes (E1, G1 and G2) and other chemical compounds are shown in Schemes 1 and 2. E1, G1 and G2 were prepared according to synthetic examples 1-4.

EXAMPLE 1

Synthesis of 5,5'-bis((9H-carbazol-9-yl)methyl)-2,2'-bipyridine

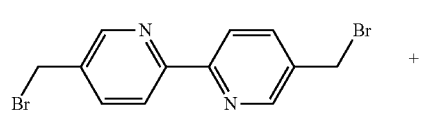

+

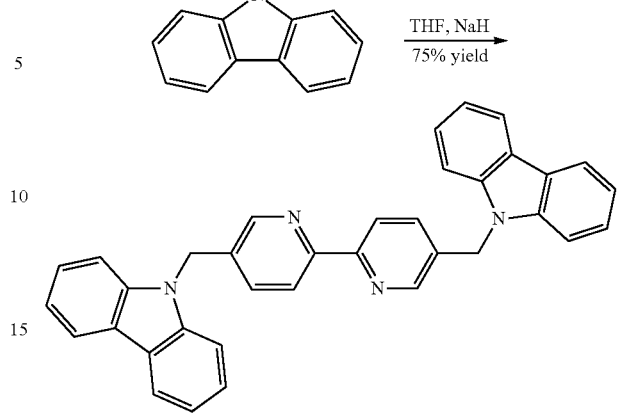

To 9H-carbazole (1.08 g, 5.98 mmol, 2.2 eq.) in 30 mL dry THF was added 0.3 g NaH (60% dispersion in mineral oil). After 20 min, 5,5'-bis(bromomethyl)-2,2'-bipyridine (1.0 g, 2.93 mmol) was added and the reaction mixture was heated at 60° C. overnight. After cooling, the reaction mixture was quenched onto ice, and an insoluble precipitated formed. It was filtered and dried. It was used without any further purification (386 mg, 75% yield). $^1$H NMR (CDCl$_3$) δ (ppm): 5.99 (s, 4H), 7.24-7.36 (8H), 7.38-7.48 (m, 8H), 8.13 (d, 2H, J=7.6 Hz), 8.18 (d, 2H, J=7.8 Hz), 8.54 (s, 2H); Anal. Calc. for C$_{36}$H$_{26}$N$_4$: C, 84.0; H, 5.1; N, 10.9; Found: C, 83.9; H, 5.4; N, 11.5%; HRMS (ESI MS) m/z: theor: 515.2230 found: 515.2233 ([M+H]$^+$ detected).

EXAMPLE 2

Synthesis of [Cu(bpy carbazole)(DPEphos)]1BF$_4$ (E1)

A mixture of [Cu(CH$_3$CN)$_4$]BF$_4$ (310 mg, 1 mmol) and bis[2-(diphenylphosphino)phenyl] ether (540 mg, 1 mmol) in 200 mL of dichloromethane was stirred at 25° C. for 2 h and then treated with a solution of 5,5'-bis((9H-carbazol-9-yl)methyl)-2,2'-bipyridine (515 mg, 1 mmol) in 50 mL of dichloromethane. The reaction mixture was stirred at room temperature during which time a precipitate formed. It was filtered off, washed with pentane and dried under vacuum (794 mg, 66% yield). $^1$H NMR (CDCl$_3$) δ (ppm): 5.25 (s, 4H), 6.3 (−6.37 (m, 2H), 6.48-6.57 (m, 4H), 6.60-6.80 (m, 8H), 6.80-7.10 (m, 16H), 7.20-7.45 (m, 16H), 7.91-8.13 (m, 2H), 8.35-8.37 (m, 2H); $^{13}$C NMR (CDCl$_3$) δ (ppm): 108.1, 110.8, 119.2, 119.7, 120.2, 120.3, 120.1, 123.3, 124.8-124.9 (m), 125.7, 126.2, 128.5 (t, J=4.9 Hz), 129.0 (t, J=4.7 Hz), 129.8 (t, J=3.9 Hz), 130.6, 131.9 (t, J=8.1 Hz), 132.7 (t, J=8.1 Hz), 133.7 (t, J=4.7 Hz), 134.3, 139.6, 140.2; $^{31}$P NMR (CDCl$_3$) δ (ppm): −11.23; HRMS (ESI MS) m/z: theor: 1115.3063 found: 1115.3066 (M$^+$. detected)

EXAMPLE 3

Synthesis of [Cu(neo)(DPEphos)]BF$_4$(G1)

A mixture of [Cu(CH$_3$CN)$_4$]BF$_4$ (310 mg, 1 mmol) and bis[2-(diphenylphosphino)phenyl] ether (540 mg, 1 mmol) in 200 mL of dichloromethane was stirred at 25° C. for 2 h and then treated with a solution of neocuproine (208 mg, 1 mmol) in 50 mL of dichloromethane. This reaction mixture was stirred at room temperature overnight and the solution was concentrated to ca. 15 mL. Addition of pentane precipitated the complex which was filtered off, washed several times with pentane and dried under vacuum. The title complex was isolated as a light yellow solid in 86% yield (772 mg). $^1$H NMR (CDCl$_3$) δ (ppm): 2.45 (s, 6H), 6.94-7.05 (m, 18H), 7.17-7.22 (m, 8H), 7.34 (td, 2H, J=6.5 Hz, J=1.8 Hz), 7.63 (d, 2H, J=8.3 Hz), 7.86 (s, 2H), 8.40 (d, 2H, J=8.3 Hz); $^{13}$C NMR (CDCl$_3$) δ (ppm): 26.9, 120.0, 125.0-125.2 (m), 125.4, 125.9, 127.5, 128.4 (t, J=4.6 Hz), 129.7, 131.5 (t, J=16.3 Hz), 132.1, 132.6 (t, J=7.8 Hz), 133.6, 137.9, 142.8 (t, J=1.7 Hz), 158.2 (t, J=6.1 Hz), 158.8; $^{31}$P NMR (CDCl$_3$) δ (ppm): −12.93; HRMS (ESI MS) m/z: theor: 809.1906 found: 809.1606 (M$^+$. detected).

EXAMPLE 4

Synthesis of G2

Copper complex G2 was prepared according to Example 3, by replacing bis[2-(diphenylphosphino)phenyl] ether with Xantphos (9,9-dimethyl-9H-xanthene-4,5-diyl)bis(diphenylphosphane).

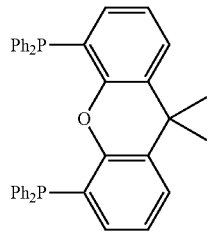

Xantphos: (9,9-dimethyl-9H-xanthene-4,5-diyl)bis(diphenylphosphane)

EXAMPLE 5

Synthesis of [Cu(diBu-phen)(DPEphos)]BF$_4$

In a round bottom flask was added [Cu(CH$_3$CN)$_4$]BF$_4$ (93 mg, 0.4 mmol) and Xantphos (214 mg, 0.4 mmol) dissolved in THF (75 mL). The solution was allowed to stir at room temperature for 1 h and a solution of 2,9-dibutyl-1,10-phenanthroline (117 mg, 0.4 mmol) in THF (9 mL) was added. The resulting solution was stirred at room temperature overnight. The solution was concentrated to the third of its initial volume and addition of pentane precipitated the solid which was filtered off, washed with pentane and dried under vacuum (302 mg, 74% yield). $^1$H NMR (CDCl$_3$) δ (ppm): 0.88 (t, 6H, J=7.6 Hz, CH$_3$), 1.26-1.30 (m, 4H, CH$_2$CH$_3$), 1.79 (s, 6H), 1.91 (quint, 4H, J=7.6 Hz, ArCH$_2$CH$_2$), 3.19 (t, 4H, J=7.6 Hz, ArCH$_2$), 6.94-6.98 (m, 2H), 6.99-7.02 (m, 14H), 7.18-7.33 (m, 6H), 7.51 (d, 2H, J=8.2 Hz), 7.57 (d, 2H, J=8.4 Hz), 7.64 (d, 2H, J=7.8 Hz), 7.84 (s, 2H), 8.41 (d, 2H, J=8.4 Hz); $^{13}$C NMR (CDCl$_3$) δ (ppm): 13.7, 13.9, 14.0, 22.2, 30.3, 40.8, 67.8, 121.8 (t, J=12.3 Hz), 122.4, 123.0, 124.8, 125.2, 127.0, 127.8, 128.4 (t, J=9.8 Hz), 129.8, 130.2, 131.1 (t, J=15.9 Hz), 132.7 (t, J=7.7 Hz), 133.81-133.84 (m), 136.2, 138.0, 142.7 (t, J=1.7 Hz), 145.2, 154.8 (t, J=6.7 Hz), 161.5; $^{31}$P NMR (CDCl$_3$) δ (ppm): −13.04; HRMS (ESI MS) m/z: theor: 933.3158 found: 933.3152 (M$^+$. detected)

EXAMPLE 6

Photopolymerization Experiments

For photopolymerization experiments, the conditions are given in the figure captions. The photosensitive formulations were deposited on a BaF$_2$ pellet under air or in laminate (25 µm thick) for irradiation with different lights. The evolution of the double bond content of TMPTA and the epoxy group content of EPOX were continuously followed by real time FTIR spectroscopy (JASCO FTIR 4100) at about 1630 cm$^{-1}$ and 790 cm$^{-1}$, respectively [8, 32].

EXAMPLE 7

Light Absorption Properties of the Copper Complexes E1, G1, and H2

The absorption spectra of the investigated copper complexes (E1, G1 and G2) in dichloromethane (DCM) are given in FIG. 1(a).

For G1 and G2, the absorption maxima at 380 nm ($\varepsilon_{380\,nm}$ ~3200 M$^{-1}$ cm$^{-1}$) and 383 nm ($\varepsilon_{383\,nm}$ ~2300 M$^{-1}$ cm$^{-1}$), respectively, correspond to a metal-to-ligand charge-transfer (MLCT) transition and more intense intraligand transitions appear at shorter wavelengths.$^{33}$[33]

Interestingly, the light absorption of E1, G1 and G2 allow efficient covering of the emission spectra of the laser diode at 405 nm (i.e. $\varepsilon_{405\,nm}$ ~2400, 2200 and 1800 M$^{-1}$ cm$^{-1}$ for E1, G1 and G2, respectively). For the laser diode at 457 nm, the overlapping with E1 ($\varepsilon_{457\,nm}$ ~670 M$^{-1}$ cm$^{-1}$) is higher than that with G1 ($\varepsilon_{457\,nm}$ ~70 M$^{-1}$ cm$^{-1}$) or G2 ($\varepsilon_{457\,nm}$ ~70 M$^{-1}$ cm$^{-1}$). The light absorptions of the studied copper complexes also ensure good overlapping with the emission spectrum of the halogen lamp.

The absorption spectrum of G1 was also studied in the more polar solvent acetonitrile (ACN), and the absorption spectra of G1 in DCM and ACN are compared in FIG. 1(b). It can be seen that the MLCT maximum shifts from 380 nm in DCM to 374 nm in ACN, which is in agreement with the previous report that the maximum shifts toward shorter wavelengths in more polar solvents. [33] More interestingly, an absorption band at approx. 450 nm is observed in ACN, which could be attributed to the solvent-dependent ligand redistribution reactions of G1 in ACN. [33]

Figure 2:
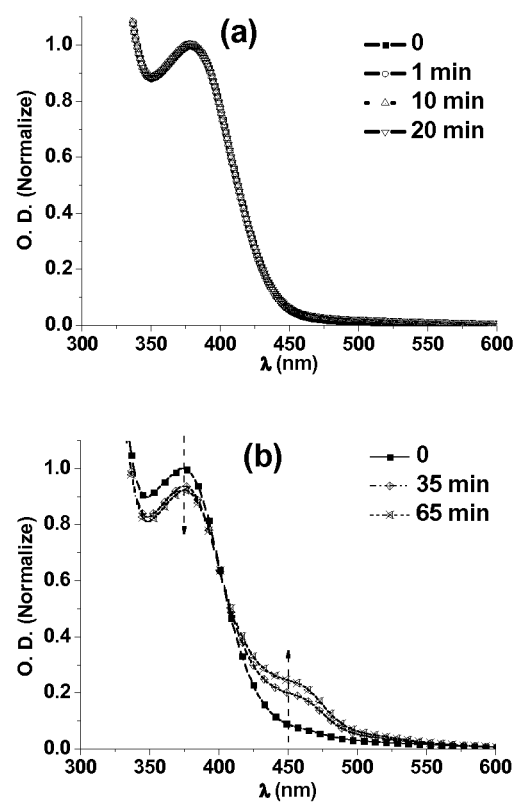
FIG. 2. UV-vis spectra of G1 in (a) DCM and (b) ACN after different irradiation (laser diode at 405 nm) time.

Furthermore, the UV-vis spectra of G1 in DCM and ACN after different irradiation (laser diode at 405 nm) time were shown in FIG. 2. It can be clearly seen that the absorption band of G1 at 374 nm decreased and the absorption at ~450 nm increased with the increasing of the irradiation time in ACN (FIG. 2(b)).

Figure 12:
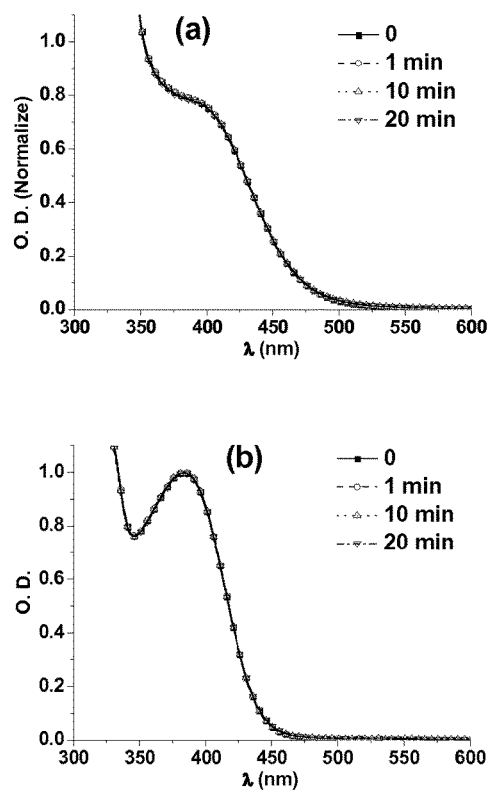
FIG. 12. UV-vis spectra of (a) E1 and (b) G2 in DCM after different irradiation (laser diode at 405 nm) time.

The appearance of absorption at ~450 nm is probably due to the presence of Cu(dmp)$_2$ complex (dmp=2,9-dimethyl-1,10-phenanthroline) in the solution, [34] and the irradiation accelerated the generation of the Cu(dmp)$_2$ complex. In the case of G1 in DCM, there was no change for the UV-vis spectra after the light irradiation (FIG. 2(a)), which indicates that G1 exhibits good photostability in DCM. [33] Similarly, E1 and G2 are also photostable in DCM (see FIG. 12).

EXAMPLE 8

Copper Complexes E1, G1, and G2 in Radical Initiating Systems

Figure 3:
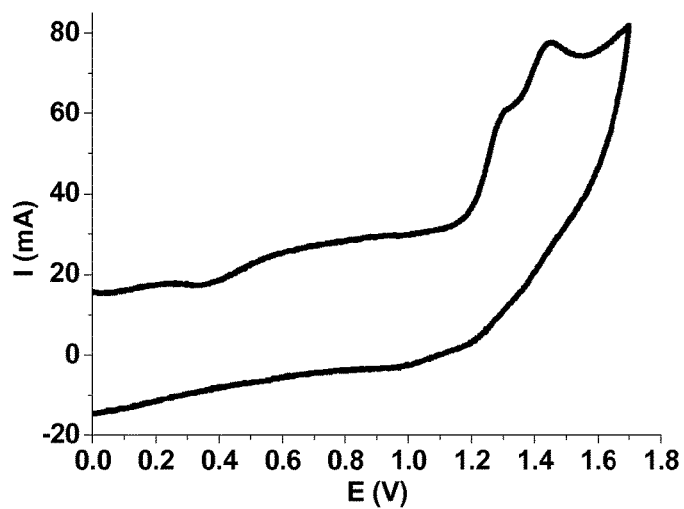
FIG. 3. Cyclic voltammogram of E1 in acetonitrile.

It has been reported that radicals could be generated from the interaction between copper complexes and halides under visible light irradiation, [21] but to the best of our knowledge there was neither investigation on radical generation from the copper complexes/iodonium salts systems under visible light, nor on their application on photopolymerization. Herein, the mechanism of radical generation from the radical initiating systems including copper complexes and iodonium salts are investigated. The free energy change of the E1/Iod1 electron transfer reaction $\Delta G=-1.72$ eV (the oxidation potential of E1, $E_{ox}=1.25$ V was measured by cyclic voltammetry (see FIG. 3); $E_S=3.17$ eV was evaluated from the average values of maximum absorption wavelength and maximum fluorescence emission wavelength of E1; and $E_{red}=-0.20$ V was used for Iod1 [7]), which is highly negative and make the process favorable.

For the G1/Iod1 combination, $\Delta G=-1.17$ eV ($E_{red}=-0.20$ V was used for Iod1, [7] $E_{ox}=1.35$ V [33] or 1.36 V [35] reported previously was used for the oxidation potential of G1, and $E_S=2.72$ eV was evaluated from the average values of maximum absorption wavelength and maximum fluorescence emission wavelength of G1), also supporting the favorable electron transfer process.

Figure 4:
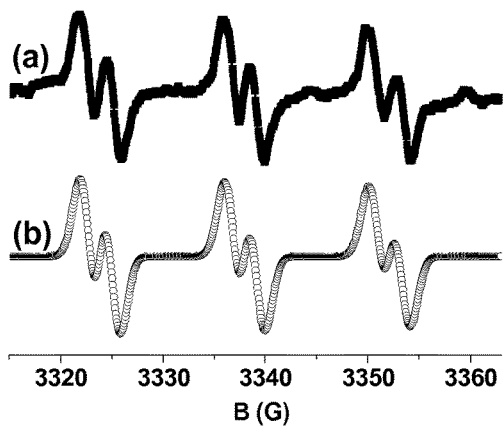
FIG. 4. ESR spectra of the radical generated in G1/Iod1 upon the halogen lamp exposure and trapped by PBN in toluene: (a) experimental and (b) simulated spectra.

In this case, the initiating radicals can be generated from the interaction between the copper complex excited state and iodonium salt. Upon the visible light (halogen lamp) irradiation of G1/Iod1, a signal of the PBN spin adduct is observed (hyperfine coupling constants: $a_N=14.2$ G; $a_H=2.2$ G) in the ESR spin trapping experiment (see FIG. 4); it is ascribed to the generation of phenyl radicals [1, 36] which could initiate the radical polymerization of TMPTA.

Furthermore, the generated phenyl radicals (Ph˙) can be converted to easily oxidizable radicals by an addition process onto the N-vinylcarbazole (NVK) double bond, and the newly generated NVK-based radicals can be further easily oxidized by an iodonium salt thereby leading to efficient initiating cations for the ring-opening cationic polymerization (ROP) of epoxides (Scheme 3). [37]

Scheme 3. Conversion of easily oxidizable NVK-based radicals from phenyl radicals, and generation of initiating cations from the oxidization of NVK-based radicals by an iodonium salt.

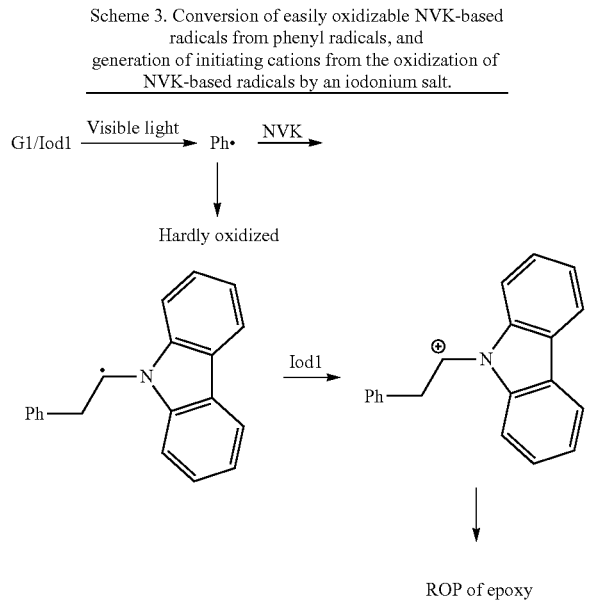

Figure 5:
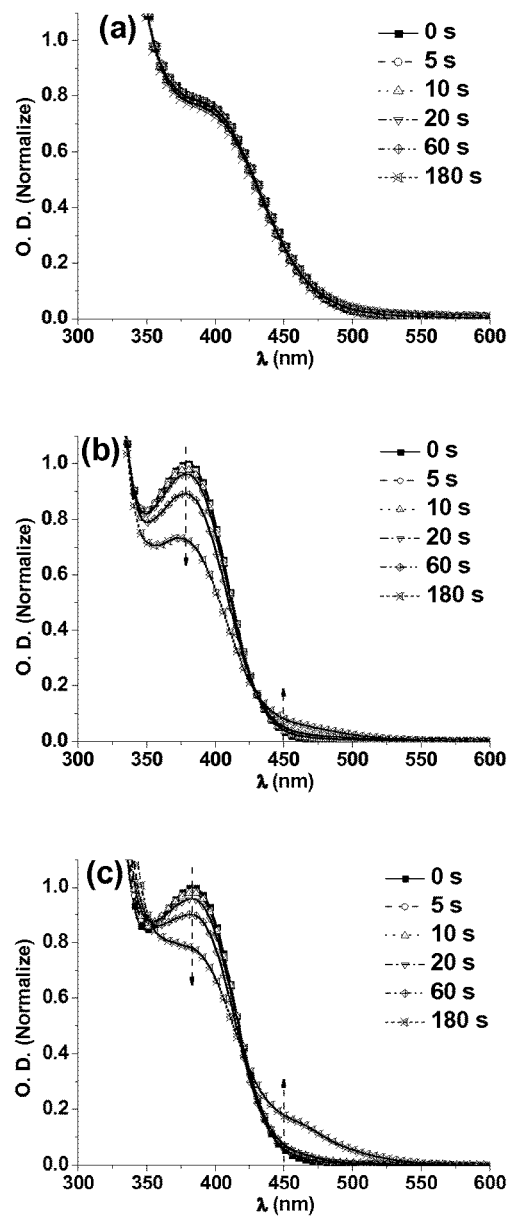
FIG. 5. Steady state photolysis of (a) E1/Iod2, (b) G1/Iod2, and (c) G2/Iod2 ([Iod2]=2.2 mM) in DCM upon the laser diode at 405 nm exposure; UV-vis spectra recorded at different irradiation time.

The steady state photolysis of E1/Iod2, G1/Iod2 and G2/Iod2 in dichloromethane are given in FIG. 5, (laser diode at 405 nm exposure under air). A very fast photolysis was observed for G1 (or G2)/Iod2 under the irradiation (FIGS. 5(b) and (c)). More specifically, the absorption at 380 nm for G1 (or 383 nm for G2) decreased fast during the irradiation and the small shoulder peak at ~450 nm appeared which was similar to that of G1 alone in ACN. It means that photochemical reaction between G1 (or G2) and Iod2 happened and the addition of Iod2 in the solution can accelerate the photolysis of G1 (or G2) in DCM, even though G1 (or G2) alone in DCM is quite photostable. On the other hand, very slow bleaching occurred in the E1/Iod2 system (FIG. 5(a)), which supports the much lower efficiencies of these systems. This is in agreement with the relative photoinitiation ability of this system (see below).

Figure 6:
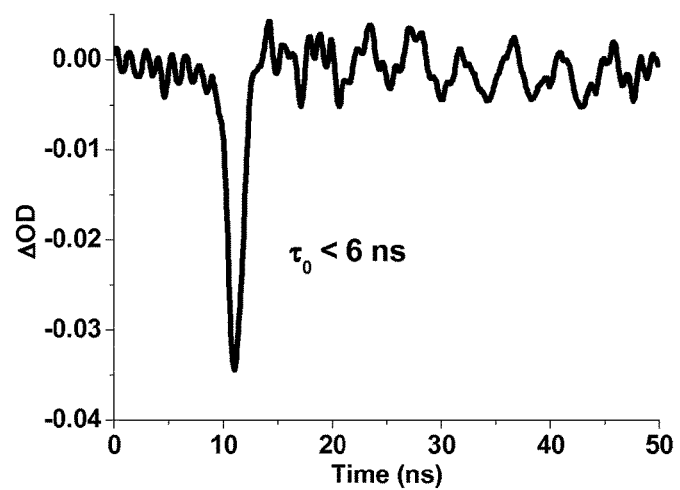
FIG. 6. Decay trace of E1 monitored at 480 nm immediately after the laser excitation at 355 nm.

Laser flash photolysis experiments were also carried out to better investigate the photochemical mechanism. For copper complex E1, the short lifetime ($\tau_0<6$ ns) of the excited state (FIG. 6) was unfavorable for the interaction between the excited state of E1 and iodonium salts: it thus led to low yield of radicals.

Figure 7:
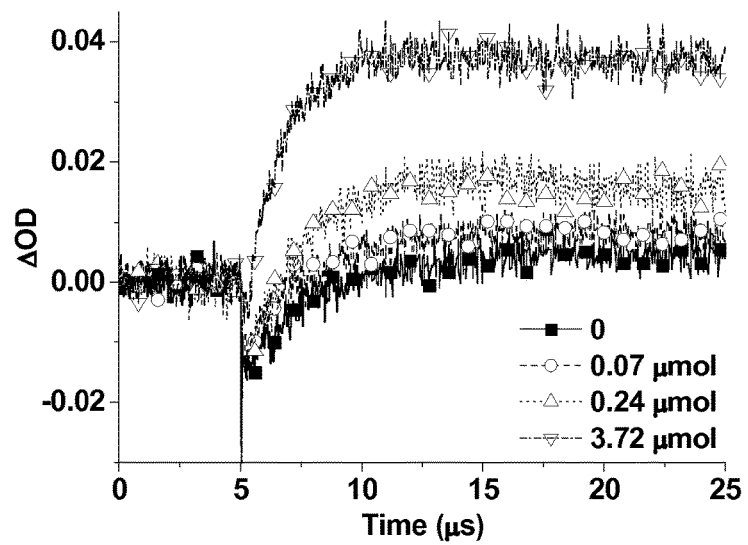
FIG. 7. Decay curves of G1 with the addition of different amount of Iod1 monitored at 600 nm immediately after the laser excitation at 355 nm in nitrogen-saturated dichloromethane.
Figure 13:
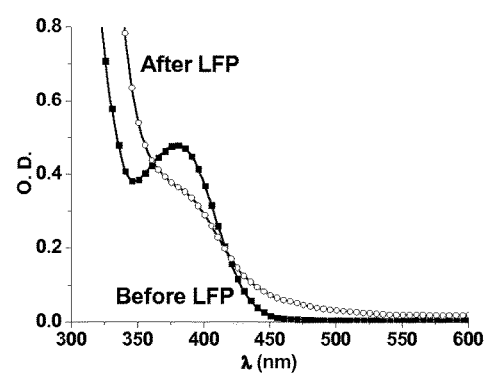
FIG. 13. UV-vis spectra of G1/Iod1 in DCM before and after LFP experiments.
Figure 14:
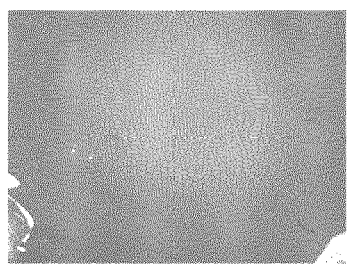
FIG. 14. Interpenetrated polymer network obtained from the photopolymerization of TMPTA/EPOX blend (50%/50%) using the initiating system described in Example 11. No phase separation is observed by optical analysis.

Following the laser excitation of G1 at 355 nm in dichloromethane, the luminescence at 600 nm exhibited a long lifetime (approx. 3 μs) in the absence of Iod1 (FIG. 7). The value measured here was different from the date (14.3 μs) [33] reported previously, but both were in the microsecond range. On increasing the Iod1 amount, it was obvious that the luminescence was quenched and a very long-lived transient absorption was observed: it can be assigned to the newly generated photochemical products during the laser excitation of G1/Iod1 combination. Furthermore, the UV-vis absorption spectra of the sample were also measured before and after the laser flash photolysis experiment (FIG. 13), it could be clearly seen that the absorption property changed after the laser excitation of LFP at 355 nm, also indicating that the new products were generated during the laser excitation.

EXAMPLE 9

Photoinitiation Ability of the Investigated Copper Complexes E1, G1 and G2 in Free Radical Photopolymerization of Acrylates As investigated above, radicals could be generated during the interaction between the copper complexes and iodonium salts. Herein, the efficiencies of the copper complex based PISs for the FRP of TMPTA are studied. For the FRP of TMPTA in laminate upon the laser diode (405 nm or 457 nm), quite low conversions (<30%) were obtained when using E1/Iod2 (0.2%/2%, w/w) PIS (FIG. 8(a) and Table 1). This is in agreement with the slow steady state photolysis of E1/Iod2 (FIG. 5(a)) and the LFP result (FIG. 6) that the short lifetime (<6 ns) for the excited state of E1 was unfavorable for the interaction between the E1 excited state and Iod2, and thus led to low efficiency for the generation of radicals to initiate the polymerization of TMPTA.

As to G1/Iod2 system, it could more efficiently initiate the FRP of TMPTA than E1/Iod2 and higher conversions (>40%) were obtained under the laser diode at 405 nm or 457 nm, or the halogen lamp irradiation. With the addition of NVK, G1/Iod2/NVK system was more efficient (i.e. higher photopolymerization rates and conversions 56%) than the two-component system (e.g. in FIG. 8(b), curve 4 vs. curve 3; Table 1) upon the halogen lamp exposure. G1/Iod2/NVK also worked under air for FRP (FIG. 8(b), curve 5) but with much lower photopolymerization rate and conversion due to the oxygen inhibition effect. Interestingly, G1/Iod2 or G1/Iod2/NVK exhibited better efficiency than the well-known CQ based PISs (FIG. 8(b) and Table 1) under the halogen lamp irradiation.

Figure 8:
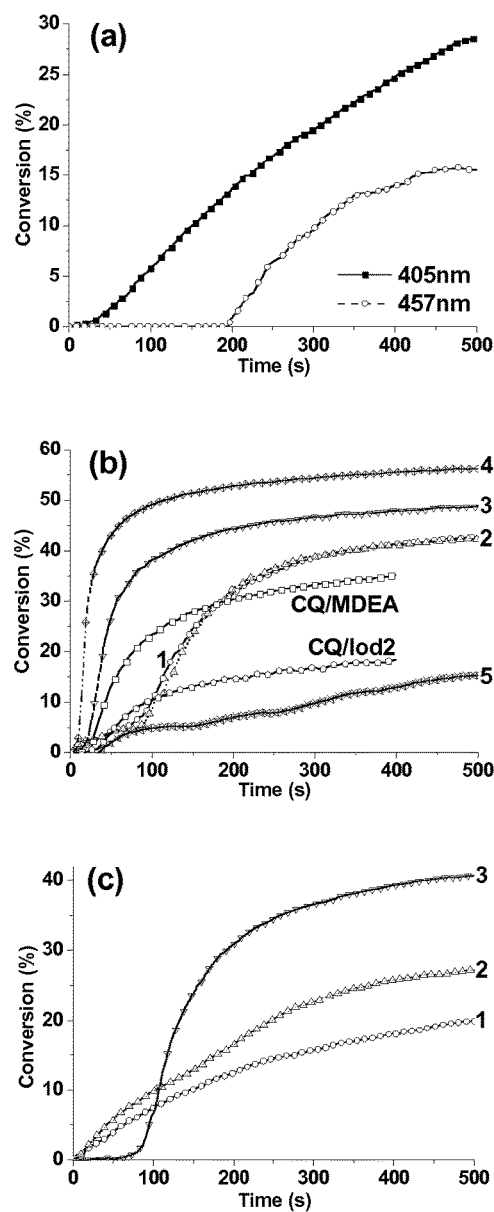
FIG. 8. Photopolymerization profiles of TMPTA in the presence of (a) E1/Iod2 (0.2%/2%, w/w) upon the laser diode at 405 nm or 457 nm exposure in laminate; (b) G1/Iod2 (0.2%/2% w/w) upon the laser diode at 405 nm (curve 1) or 457 nm (curve 2), or halogen lamp (curve 3) exposure in laminate; G1/Iod2/NVK (0.2%/2%/3%, w/w/w) upon the halogen lamp exposure in laminate (curve 4) or under air (curve 5); (c) G2/Iod2 (0.2%/2% w/w) upon the laser diode at 405 nm (curve 1) or 457 nm (curve 2), or halogen lamp (curve 3) exposure in laminate.

For the G2/Iod2 PIS (FIG. 8(c)), it was not as efficient as G1/Iod2 system which could be ascribe to the better light absorption property (higher extinction coefficient) of G1 than that of G2 (FIG. 1(a)).

TABLE 2

TMPTA conversions obtained in laminate or under air upon exposure to different visible light sources for 500 s in the presence of E1, G1, or G2 based PISs (E1, G1, or G2: 0.2 wt %; Iod2: 2 wt %; NVK: 3 wt %); CQ/Iod (0.5%/2%, w/w) or CQ/MDEA (0.5%/2%, w/w) as references.

| | Laser diode (405 nm) | Laser diode (457 nm) | Halogen lamp | LED (405 nm) | LED (455 nm) |
|---|---|---|---|---|---|
| E1/Iod2 | 29%[a] | 15%[a] | | | |
| G1/Iod2 | 43%[a] | 42%[a] | 49%[a] | | |
| G1/Iod2/NVK | | | 56%[a]\|15%[b] | 62%[a] | 57%[a] |
| G2/Iod2 | 20%[a] | 27%[a] | 41%[a] | | |
| CQ/MDEA | | | 35%[a,c] | | |
| CQ/Iod | | | 18%[a,c] | | |

[a]in laminate;
[b]under air;
[c]400 s of light irradiation.

EXAMPLE 10

Photoinitiation Ability of the Investigated Copper Complexes E1, G1 and G2 in Cationic Photopolymerization of Epoxides The cationic photopolymerization of EPOX in the presence of E1 (0.2%), E1/Iod1 (0.2%/2%, w/w) or E1/(TMS)$_3$Si—H/Iod1 (0.2%/3%/2%, w/w/w) under air were carried out using the laser diode (457 nm) or halogen lamp irradiation, but no polymerization was observed in all the case.

G2 based PISs (e.g. G2/Iod1 or G2/Iod1/NVK) were ineffective for CP of EPOX either. Similarly, the well-known CQ based systems (i.e. CQ/Iod2 or CQ/Iod2/NVK) did not work either under the halogen lamp irradiation.

Figure 9:
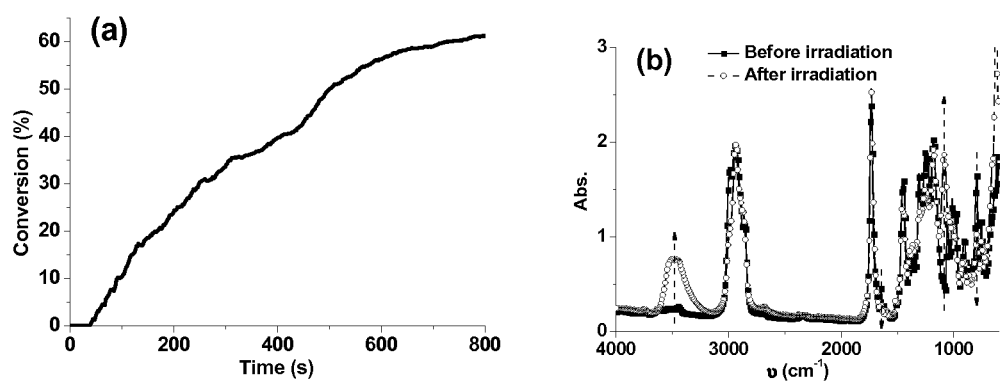
FIG. 9. (a) Photopolymerization profile and (b) IR spectra recorded before and after the photopolymerization of EPOX in the presence of G1/Iod1/NVK (0.2%/2%/3%, w/w/w) upon the halogen lamp exposure under air.

Remarkably, G1/Iod1/NVK PIS exhibits good initiation ability for the polymerization of EPOX under air upon the halogen lamp exposure (FIG. 9(a)). During the photopolymerization, the epoxy group of EPOX (at 790 cm$^{-1}$, with the final conversion 61%) consumption was associated with the consumption of the double bond of NVK (at ~1640 cm$^{-1}$, with final conversion 74%), and the concomitant formation of the polyether (at ~1080 cm$^{-1}$) and hydroxyl groups (at ~3500 cm$^{-1}$) (cf. FIG. 9(b)). The laser diode at 405 nm could also initiate the CP of EPOX (with the final conversion 32%), but it was not as efficient as the halogen lamp. The initiation ability of G1/Iod1 PIS for the CP of EPOX was also studied under air upon the halogen lamp and laser diode at 405 nm exposure, but the polymerization conversions (the final conversion is 11% and 13% for halogen lamp and laser diode at 405 nm, respectively) were quite low. It means that the addition of NVK in the formulations could promote the CP of EPOX as previously reported. [37]

EXAMPLE 11

Figure 10:
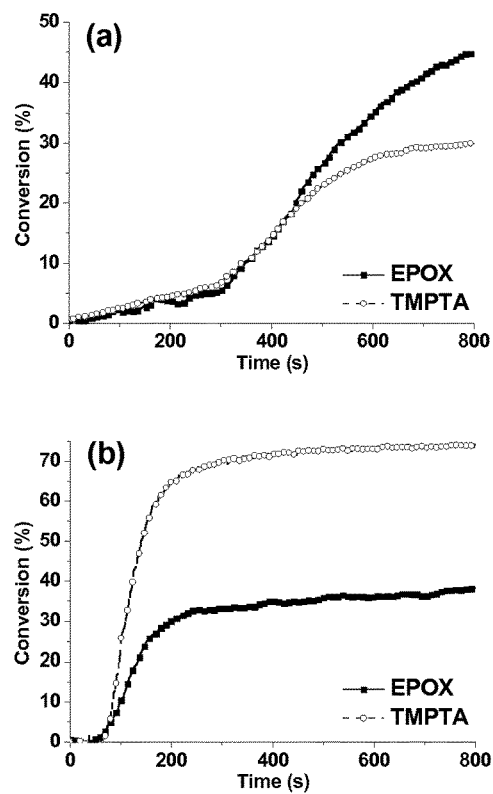
FIG. 10. Photopolymerization profiles of EPOX/TMPTA blend (50%/50%, w/w) in the presence of G1/Iod2/NVK (0.1%/3%/5%, w/w/w) (a) under air or (b) in laminate upon the halogen lamp exposure.

Photoinitiation Ability of the Investigated Copper Complexes E1, G1 and G2 in IPN Synthesis: Photopolymerization of EPOX/TMPTA Blends The G1/Iod1/NVK PIS allows the formation of interpenetrated polymer networks (IPNs) through concomitant cationic/radical photopolymerization of EPOX/TMPTA blend (50%/50% w/w) under air or in laminate upon the halogen lamp exposure (FIG. 10). As elsewhere, [38-40] the polymerization conversion of TMPTA are higher in laminate than under air and the situation is opposite when considering the EPOX conversions (Table 2). It is attributed to the fact that the FRP of TMPTA is faster than FRPCP of EPOX and most of the free radicals are consumed to initiate the FRP when the oxygen inhibition effect is reduced by the laminated condition.

TABLE 2

EPOX and TMPTA conversions obtained in the photopolymerization of EPOX/TMPTA blend (50%/50%, w/w) under air or in laminate upon exposure to the halogen lamp (t = 800 s) in the presence of G1/Iod1/NVK (0.1%/3%/5%, w/w/w).

| | EPOX conversion | TMPTA conversion |
|---|---|---|
| Under air | 45% | 30% |
| In laminate | 38% | 74% |

On the basis of the above studies, the photochemical mechanism of the cation formation is proposed in reactions 1-4:

$$Cu^I \rightarrow {}^*Cu^I(h\upsilon) \quad (1)$$

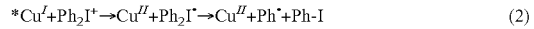

$$^*Cu^I + Ph_2I^+ \rightarrow Cu^{II} + Ph_2I^\cdot \rightarrow Cu^{II} + Ph^\cdot + Ph\text{-}I \quad (2)$$

$$Ph^\cdot + NVK \rightarrow Ph\text{-}NVK^\cdot \quad (3)$$

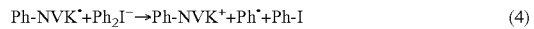

$$Ph\text{-}NVK^\cdot + Ph_2I^+ \rightarrow Ph\text{-}NVK^+ + Ph^\cdot + Ph\text{-}I \quad (4)$$

The formed $Cu^{II}$ in reaction 2 exhibited the slight efficiency to initiate the photopolymerization of EPOX with the low final conversion, this may be attributed to the fact that the active site ($Cu^{II}$) was enveloped by the ligands and difficult to interact with epoxy groups in the formulation. After the conversion of phenyl radicals to more easily oxidizable NVK-based radicals (reaction 3), the NVK-based cations were then generated from the oxidation of NVK-based radicals by iodonium salts (reaction 4). And the NVK-based cations exhibited high efficiency to initiate photopolymerization of EPOX.

In conclusion, copper complexes G1 or G2 with iodonium salt (and optionally NVK) can work as the photoinitiating systems for the radical photopolymerization of TMPTA under different visible light irradiations (e.g. polychromatic visible light from halogen lamp, laser diodes at 405 nm or 457 nm). More interestingly, G1/Iod1/NVK system exhibited good initiation ability for the cationic photopolymerization of EPOX under air upon the halogen lamp exposure. The E1 based system was not as efficient. The photochemical mechanism studies reveal that the ligands of the copper complexes play an important role for their properties (e.g. light absorption properties or luminescence lifetime) which could affect their photoinitiation ability.

EXAMPLE 12

Polymer Analysis

The polymers synthesized according to the photopolymerization method of the invention can be characterized by various methods:

NMR data for confirmation of the chemical structure of the polymer.

Gel Permeation Chromatography (GPC) data for an assessment of chain-length and polymer dispersity. The Mn value can be routinely determined by GPC; GPC analyses may be performed on a GPC system equipped with a Shimadzu RID10A refractometer detector and three 5-μl PL gel columns (300×7.5 mm, Varian Corporation and Mixed-C porosity) in series, and using HPLC-grade THF as an eluent. The GPC columns may be eluted with THF at 45° C. at 1 mL/min and were calibrated with polystyrene standards, specifically 23 monodisperse polystyrene standards. Analysis of the GPC data and calculation of the Mn and PDI values may be done with standard GPC software. Molecular weights and polydispersity indices (PDIs) may be calculated using polystyrene standards. In the case of molecular weight number values ($M_n$), these may be corrected using by multiplying the experimental values (PS standard) by the correcting factor 0.58 (cf: Save et al., [46]). Accordingly, throughout this document, when Mn and DPI values are recited, they refer to measurements determined by GPC equipped with differential refractive index detectors, and polystyrene standard. Preferably, the measurements are done with THF as eluent, and at room temperature. Alternatively, or additionally, the Mn and DPI values could be determined by GPC equipped with light diffraction detectors, and polystyrene standard.

Differential scanning calorimetry (DSC) for melting point determination, and assessment of crystalline or semi-crystalline nature of the polymers.

Fourier transformed Infra red for monitoring the progress of the photopolymerization, or simultaneous free radical/cationic photopolymerization and assessment of homogenous character of the resulting interpenetrated polymer network.

In summary, three copper complexes (E1, G1 and G2) with different ligands were used to generate aryl radicals in combination of iodonium salts (and another additive) upon visible light exposure. This approach can be worthwhile to initiate the free radical photopolymerization and ring-opening cationic photopolymerization under halogen lamp and laser diode, for example, or any visible light source. The photochemical mechanism of the production of initiating radicals was studied using ESR spin trapping, photolysis, luminescence, and laser flash photolysis techniques. As shown by the photopolymerization kinetics obtained from FTIR spectroscopy, G1 and G2 in the presence of iodonium salt (and another additive) exhibited good initiation polymerization abilities.

More generally, organometallic copper complexes with different ligands have been developed and used in polymerization photoinitiator systems for polymer synthesis under very mild conditions (ambient temperature, and even visible sunlight). As such, free radical and/or cationic polymerizations could be carried out. By effecting a selection of ligands, copper complexes were characterized by light absorption properties in different wavelength ranges in the visible range. These complexes proved to be very effective for different synthesis conditions (halogen lamp, LED, laser diode, sunlight etc . . . ). Under gentle irradiation conditions, free radicals could be produced by interaction between the copper complexes and iodonium salts. These bicomponent systems can very effectively initiate the polymerization of acrylic resins. High final conversions were reached after only 5 minutes of irradiation with a halogen lamp. Remarkably, the free radicals produced in these systems may be converted into cations (an oxidizing radical process) by the addition of an additive such as N-vinylcarbazole (NVK) while allowing access to the cationic polymerization initiator (polymerization of epoxy, vinyl ether . . . ). The use of these three-component systems (copper complexes/iodonium salt/NVK) allows the simultaneous polymerization of mixtures of free radical and cationic monomers (e.g., acrylate/epoxide) allowing access to the synthesis of hybrid polymer mixtures or interpenetrating interconnected polymers again under interesting synthetic conditions (room temperature, mild irradiation, the presence of ambient oxygen).

While we have described a number of embodiments of this invention, it is apparent that our basic examples may be altered to provide other embodiments that utilize the catalysts and methods of this invention. Therefore, it will be appreciated that the scope of this invention is to be defined by the appended claims rather than by the specific embodiments that have been represented by way of example.

REFERENCES (1) Lalevée, J.; Blanchard, N.; Tehfe, M. A.; Morlet-Savary, F.; Fouassier, J. P. Macromolecules 2010, 43, 10191-10195.
(2) Lalevée, J.; Blanchard, N.; Tehfe, M. A.; Peter, M.; Morlet-Savary, F.; Gigmes, D.; Fouassier, J. P. Polym. Chem. 2011, 2, 1986-1991.
(3) Lalevée, J.; Blanchard, N.; Tehfe, M. A.; Peter, M.; Morlet-Savary, F.; Fouassier, J. P. Macromol. Rapid Commun. 2011, 32, 917-920.
(4) Lalevée, J.; Tehfe, M. A.; Dumur, F.; Gigmes, D.; Blanchard, N.; Morlet-Savary, F.; Fouassier, J. P. ACS Macro Lett. 2012, 1, 286-290.
(5) Lalevée, J.; Peter, M.; Dumur, F.; Gigmes, D.; Blanchard, N.; Tehfe, M. A.; Morlet-Savary, F.; Fouassier, J. P. Chem. Eur. J. 2011, 17, 15027-15031.
(6) Tehfe, M. A.; Gigmes, D.; Dumur, F.; Bertin, D.; Morlet-Savary, F.; Graff, B.; Lalevée, J.; Fouassier, J. P. Polym. Chem. 2012, 3, 1899-1902.
(7) Lalevée, J.; Dumur, F.; Mayer, C. R.; Gigmes, D.; Nasr, G.; Tehfe, M. A.; Telitel, S.; Morlet-Savary, F.; Graff, B.; Fouassier, J. P. Macromolecules 2012, 45, 4134-4141.
(8) Tehfe, M.-A.; Lalevée, J.; Telitel, S.; Sun, J.; Zhao, J.; Graff, B.; Morlet-Savary, F.; Fouassier, J.-P. Polymer 2012, 53, 2803-2808.
(9) Xiao, P.; Zhang, J.; Dumur, F.; Tehfe, M. A.; Morlet-Savary, F.; Graff, B.; Gigmes, D.; Fouassier, J. P.; Lalevée, J. Prog. Polym. Sci. 2014, Under review.
(10) Nicewicz, D. A.; MacMillan, D. W. C. Science 2008, 322, 77-80.
(11) Renaud, P.; Leong, P. Science 2008, 322, 55-56.
(12) Nagib, D. A.; Scott, M. E.; MacMillan, D. W. C. J. Am. Chem. Soc. 2009, 131, 10875-10877.
(13) Zeitler, K. Angew. Chem. Int. Ed. 2009, 48, 9785-9789.
(14) Shih, H.-W.; Vander Wal, M. N.; Grange, R. L.; MacMillan, D. W. C. J. Am. Chem. Soc. 2010, 132, 13600-13603.
(15) Pham, P. V.; Nagib, D. A.; MacMillan, D. W. C. Angew. Chem. Int. Ed. 2011, 50, 6119-6122.
(16) Cuttell, D. G.; Kuang, S.-M.; Fanwick, P. E.; McMillin, D. R.; Walton, R. A. J. Am. Chem. Soc. 2002, 124, 6-7.
(17) Zhang, Q.; Zhou, Q.; Cheng, Y.; Wang, L.; Ma, D.; Jing, X.; Wang, F. Adv. Funct. Mater. 2006, 16, 1203-1208.
(18) Zhang, Q.; Komino, T.; Huang, S.; Matsunami, S.; Goushi, K.; Adachi, C. Adv. Funct. Mater. 2012, 22, 2327-2336.

(19) Armaroli, N.; Accorsi, G.; Holler, M.; Moudam, O.; Nierengarten, J. F.; Zhou, Z.; Wegh, R. T.; Welter, R. Adv. Mater. 2006, 18, 1313-1316.

(20) Hernandez-Perez, A. C.; Vlassova, A.; Collins, S. K. Org. Lett. 2012, 14, 2988-2991.

(21) Pirtsch, M.; Paria, S.; Matsuno, T.; Isobe, H.; Reiser, O. Chem. Eur. J. 2012, 18, 7336-7340.

(22) Gong, T.; Adzima, B. J.; Baker, N. H.; Bowman, C. N. Adv. Mater. 2013, 25, 2024-2028.

(23) Alzahrani, A. A.; Erbse, A. H.; Bowman, C. N. Polym. Chem. 2014, DOI: 10.1039/c3py01064c.

(24) Tasdelen, M. A.; Ciftci, M.; Yagci, Y. Macromol. Chem. Phys. 2012, 213, 1391-1396.

(25) Ciftci, M.; Tasdelen, M. A.; Li, W.; Matyjaszewski, K.; Yagci, Y. Macromolecules 2013, 46, 9537-9543.

(26) Konkolewicz, D.; Schröder, K.; Buback, J.; Bernhard, S.; Matyjaszewski, K. ACS Macro Lett. 2012, 1, 1219-1223.

(27) Gong, T.; Adzima, B. J.; Bowman, C. N. Chem. Commun. 2013, 49, 7950-7952.

(28) Castellanos, F.; Cavezzan, J.; Fouassier, J. P.; Priou, C. U.S. Pat. No. 5,668,192, Rhone-Poulenc Chimie 1997.

(29) Castellanos, F.; Fouassier, J. P.; Priou, C.; Cavezzan, J. J. Appl. Polym. Sci. 1996, 60, 705-713.

(30) Rehm, D.; Weller, A. Isr. J. Chem. 1970, 8, 259-271.

(31) Xiao, P.; Lalevée, J.; Allonas, X.; Fouassier, J. P.; Ley, C.; El Roz, M.; Shi, S. Q.; Nie, J. J. Polym. Sci., Part A: Polym. Chem. 2010, 48, 5758-5766.

(32) Tehfe, M. A.; Lalevée, J.; Morlet-Savary, F.; Graff, B.; Blanchard, N.; Fouassier, J. P. Macromolecules 2012, 45, 1746-1752.

(33) Kuang, S.-M.; Cuttell, D. G.; McMillin, D. R.; Fanwick, P. E.; Walton, R. A. Inorg. Chem. 2002, 41, 3313-3322.

(34) Atkins, C. E.; Park, S. E.; Blaszak, J. A.; McMillin, D. R. Inorg. Chem. 1984, 23, 569-572.

(35) Armaroli, N.; Accorsi, G.; Bergamini, G.; Ceroni, P.; Holler, M.; Moudam, O.; Duhayon, C.; Delavaux-Nicot, B.; Nierengarten, J.-F. Inorg. Chim. Acta 2007, 360, 1032-1042.

(36) Tehfe, M. A.; Lalevée, J.; Telitel, S.; Contal, E.; Dumur, F.; Gigmes, D.; Bertin, D.; Nechab, M.; Graff, B.; Morlet-Savary, F.; Fouassier, J. P. Macromolecules 2012, 45, 4454-4460.

(37) Lalevée, J.; Tehfe, M.-A.; Zein-Fakih, A.; Ball, B.; Telitel, S.; Morlet-Savary, F.; Graff, B.; Fouassier, J. P. ACS Macro Lett. 2012, 1, 802-806.

(38) Xiao, P.; Dumur, F.; Tehfe, M.-A.; Graff, B.; Gigmes, D.; Fouassier, J. P.; Lalevée, J. Polymer 2013, 54, 3458-3466.

(39) Xiao, P.; Dumur, F.; Graff, B.; Gigmes, D.; Fouassier, J. P.; Lalevée, J. Macromolecules 2013, 46, 7661-7667.

(40) Xiao, P.; Dumur, F.; Graff, B.; Fouassier, J. P.; Gigmes, D.; Lalevée, J. Macromolecules 2013, 46, 6744-6750.

(41) Zhang, Q.; Ding, J.; Cheng, Y.; Wang, L.; Xie, Z.; Jing, X.; Wang, F. Advanced Functional Materials 2007, 17, 2983-2990.

(42) Wang, L.-Y.; Xu, Y.; Lin, Z.; Zhao, N.; Xu, Y. Journal of Luminescence 2011, 131, 1277-1282.

(43) Su, Z.; Li, W.; Chu, B.; Xu, M.; Che, G.; Wang, D.; Han, L.; Li, X.; Zhang, D.; Bi, D.; Chen, Y. J. Phys. D: Appl. Phys. 2008, 41, 085103.

(44) Si, Z.; Li, J.; Li, B.; Liu, S.; Li, W. Journal of Luminescence 2008, 128, 1303-1306.

(45) Harkins, S. B.; Peters, J. C. Journal of the American Chemical Society 2005, 127, 2030-2031.

(46) Save et al., Macromol. Chem. Phys. 2002, 203, 889-899.

The invention claimed is:

1. A liquid composition, curable by exposure to light irradiation ranging from λ=200-900 nm, containing:
   (a) at least one polymerisable component selected from the group consisting of:
      (i) an ethylenically unsaturated monomer, the polymerization of which may be effected by free radical polymerization; and/or
      (ii) an ethylenically unsaturated monomer or an epoxy-containing monomer; the polymerization of which may be effected by cationic polymerization;
   (b) a photoinitiator complex of formula I or II:

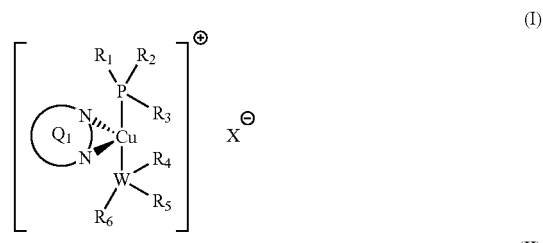

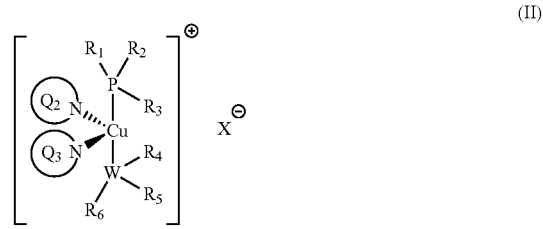

wherein
   $Q_1$ represents a conjugated polyaromatic system containing two nitrogen atoms whose lone pair of electrons forms a bond with the copper atom;
   $Q_2$ and $Q_3$ independently represent a conjugated polyaromatic system containing one nitrogen atom whose lone pair of electrons forms a bond with the copper atom;
   W represents a phosphorus or nitrogen atom;
   $R_1$, $R_2$, $R_3$, $R_4$, $R_5$ and $R_6$ each independently represents a $C_{6-20}$ alkyl or $C_{6-10}$ aryl moiety; wherein the alkyl and/or the aryl moieties may be, individually, further substituted with one or more linear or branched $C_{1-6}$alkyl or $C_{6-10}$ aryl moieties; and wherein $R_3$ and $R_4$, together with the P, Cu and W atoms, may form a 6- to 8-membered ring;
   X represents a suitable counterion; preferably $BF_4^-$, $PF_6^-$, $SbF_6^-$ or $Cl^-$;
   (c) an iodonium salt of formula $(R^4)_2I^+$; wherein each occurrence of $R^4$ independently represents a $C_{6-10}$ aryl moiety; wherein the aryl moiety may be, individually, further substituted with one or more linear or branched $C_{1-6}$alkyl or $C_{6-10}$ aryl moieties;
   and provided that, when at least one polymerisable component (a) is an ethylenically unsaturated monomer or an epoxy-containing monomer polymerisable by cationic polymerization, the liquid composition further comprises
   (b) a vinyl cation initiator having the structure III or IV:

-continued

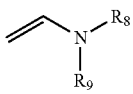

(IV)

wherein $R_7$ represents a linear or branched $C_{1-6}$alkyl or $C_{1-10}$heteroalkenyl moiety or a $C_{6-10}$aryl moiety; and $R_8$ and $R_9$ independently represent a linear or branched $C_{1-6}$alkyl moiety or a $C_{6-10}$aryl moiety; where $R_8$ and $R_9$ together may form a cyclic heteroaryl moiety.

2. Liquid composition according to claim 1, further comprising, in combination with the vinyl cation initiator having the structure III or IV, a silane moiety of formula $(R^B)_3SiH$; wherein each occurrence of $R^B$ independently represents —$SiR_3$ wherein each occurrence of R independently represents a linear or branched $C_{1-6}$alkyl moiety.

3. Method for effecting free radical and/or cationic photopolymerisation under light irradiation conditions ranging from λ=200-900 nm, comprising the step of polymerizing at least one polymerisable component selected from the group consisting of:
(i) an ethylenically unsaturated monomer, the polymerization of which may be effected by free radical polymerization; and/or
(ii) an ethylenically unsaturated monomer or an epoxy-containing monomer; the polymerization of which may be effected by cationic polymerization;
in the presence of:
A) light irradiation ranging from λ=200-900 nm;
B) an initiator complex of formula I or II

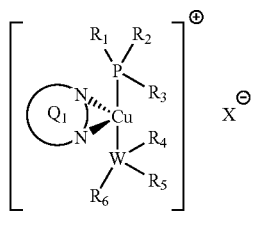

(I)

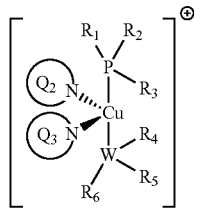

(II)

wherein $Q_1$, $Q_2$, $Q_3$, $R_1$-$R_6$, W and X are as defined in claim 1;
C) an iodonium salt of formula $(R^A)_2I^+$; wherein $R^A$ is as defined in claim 1; and
when at least one polymerisable component is an ethylenically unsaturated monomer or an epoxy-containing monomer; whose polymerization is effected by cationic polymerization, the photopolymerisation method is additionally carried out in presence of:
D) a vinyl cation initiator having the structure III or IV:

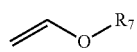

(III)

-continued

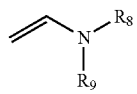

(IV)

wherein $R_7$-$R_9$ are as defined in claim 1.

4. Photopolymerization method according to claim 3, further comprising, in combination with the vinyl cation initiator having the structure III or IV, a silane moiety of formula $(R^B)_3SiH$; wherein each occurrence of $R^B$ independently represents —$SiR_3$ wherein each occurrence of R independently represents a linear or branched $C_{1-6}$alkyl moiety.

5. Photopolymerization method according to claim 3, wherein in the initiator complex:
$Q_1$ has the formula:

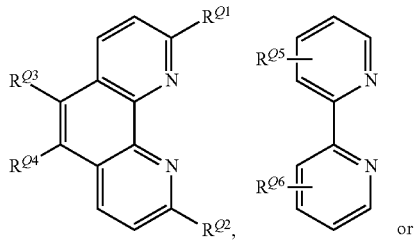

wherein
$R^{Q1}$ and $R^{Q2}$ independently represent H or a linear or branched $C_{1-6}$alkyl moiety;
$R^{Q3}$ and $R^{Q4}$ independently represent H or —$NR^CR^D$ wherein $R^C$ and $R^D$ independently represent a linear or branched $C_{1-6}$alkyl moiety or a $C_{6-10}$aryl moiety; where $R^C$ and $R^D$ together may form a 5- or 6-membered heterocyclic moiety wherein the heterocyclic moiety may be further substituted with —CN, a linear or branched $C_{1-6}$alkyl moiety, a $C_{6-10}$aryl or $C_{6-12}$heteroaryl moiety;
$R^{Q5}$ and $R^{Q6}$ independently represent H or a linear or branched $C_{1-10}$alkyl moiety; wherein the alkyl moieties may be independently further substituted with —$NR^ER^F$ wherein $R^E$ and $R^F$ independently represent a linear or branched $C_{1-6}$alkyl moiety or a $C_{6-10}$aryl moiety, or wherein $R^E$ and $R^F$ together with the nitrogen atom to which they are attached form a mono- or polycyclic $C_{6-12}$heterocyclic moiety;
$R^{Q7}$ and $R^{Q8}$ independently represent H or a linear or branched $C_{1-6}$alkyl moiety or a $C_{6-10}$aryl moiety; and $Q_2$ and $Q_3$ independently have the formula:

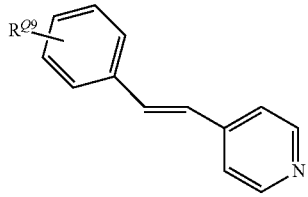

wherein $R^{Q9}$ represents H or $-NR^G R^H$ wherein $R^G$ and $R^H$ independently represent a linear or branched $C_{1-6}$alkyl moiety or a $C_{6-10}$aryl moiety.

6. Photopolymerization method according to claim 3, wherein the initiator complex has formula $I^A$ or $II^A$:

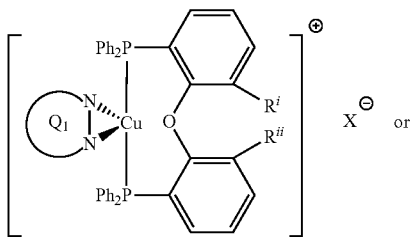

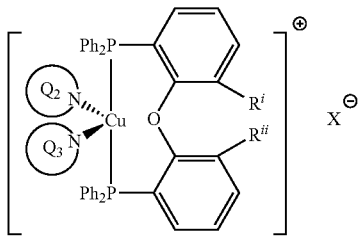

wherein $Q_1$, $Q_2$ and $Q_3$ are as defined in claim 1; and $R^i$ and $R^{ii}$ independently represent H or a linear or branched $C_{1-6}$alkyl moiety.

7. Photopolymerization method according to claim 3, wherein the initiator complex has formula $I^B$ or $II^B$:

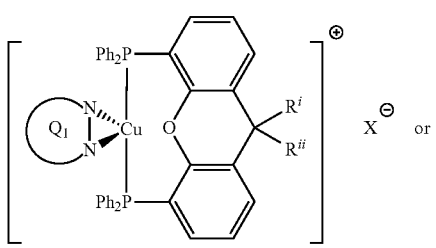

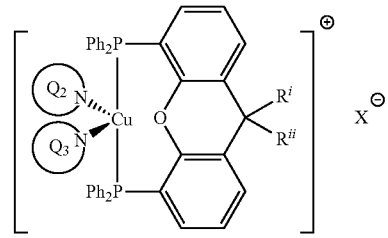

wherein $Q_1$, $Q_2$ and $Q_3$ are as defined in claim 1; and $R^i$ and $R^{ii}$ independently represent H or a linear or branched $C_{1-6}$alkyl moiety.

8. Photopolymerization method according to claim 3, wherein the initiator complex has one of the following structures:

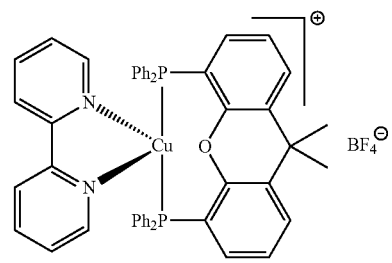

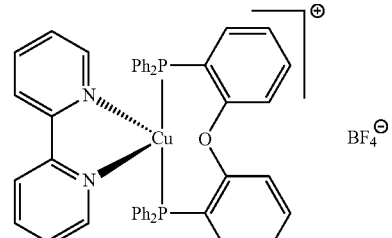

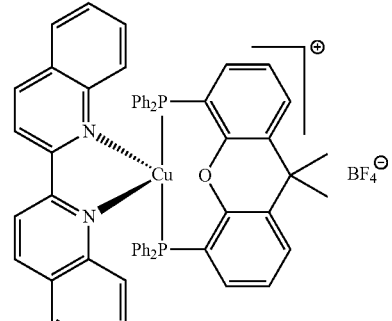

-continued
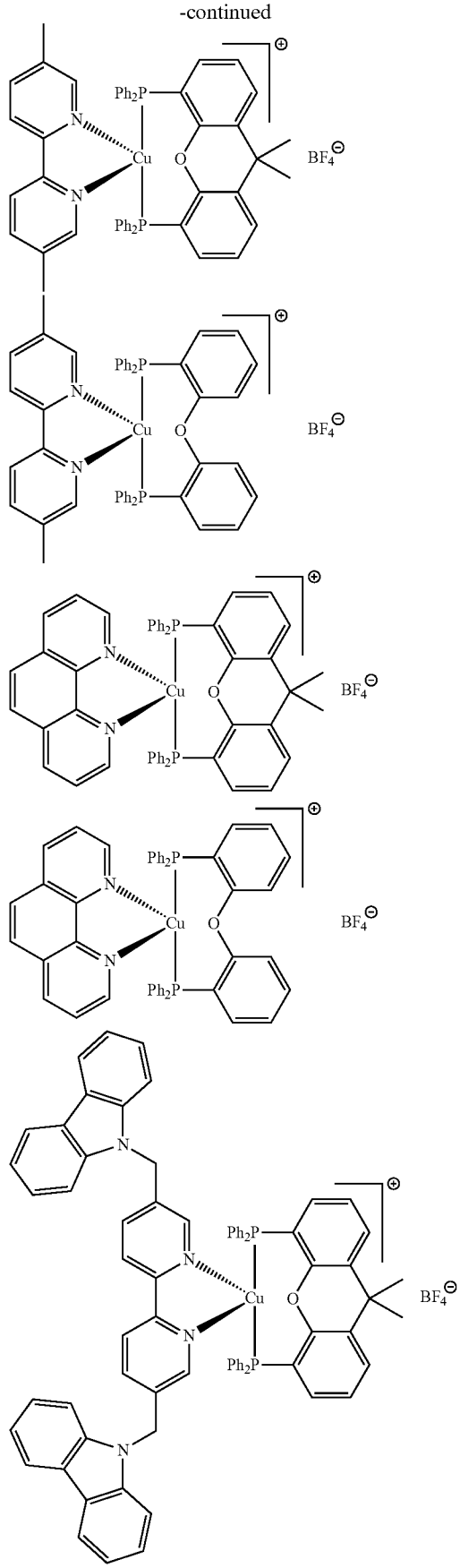
-continued
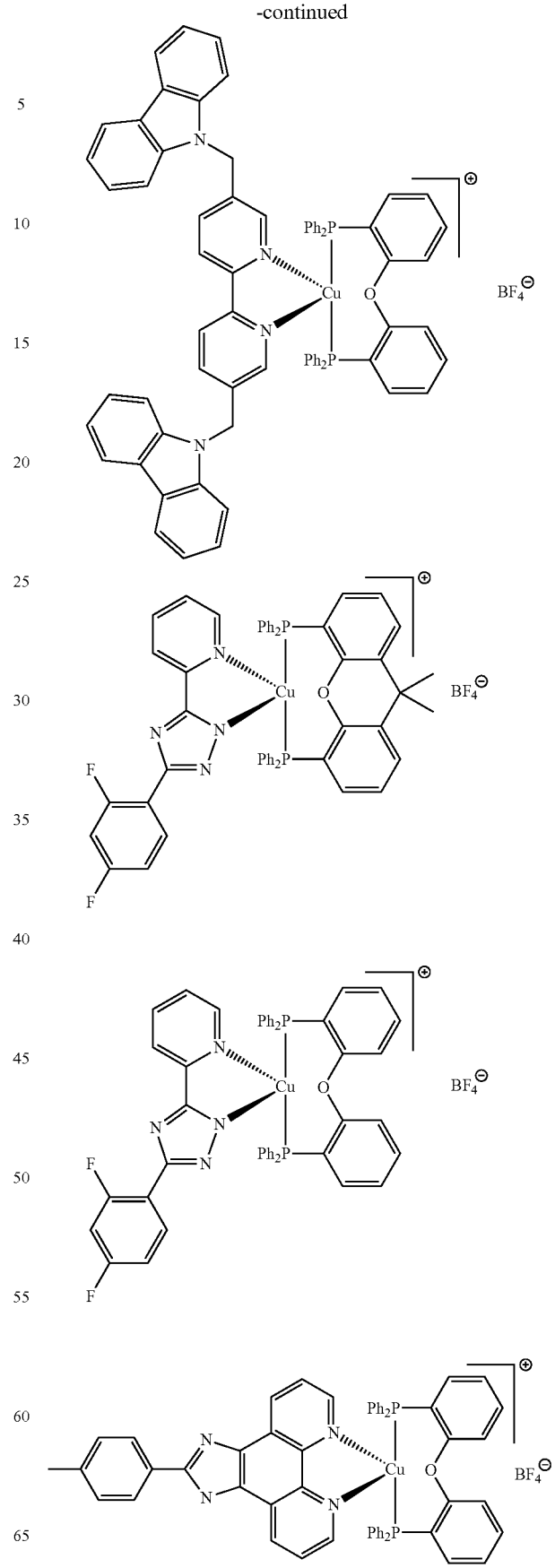

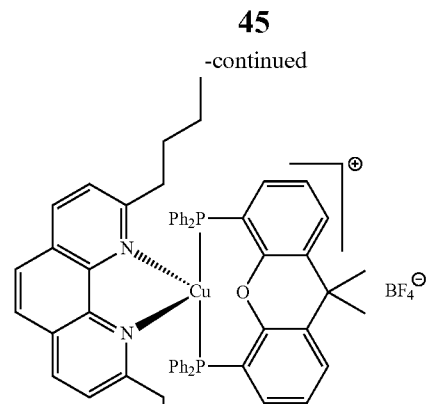
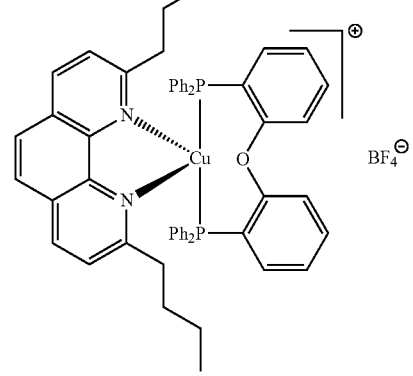
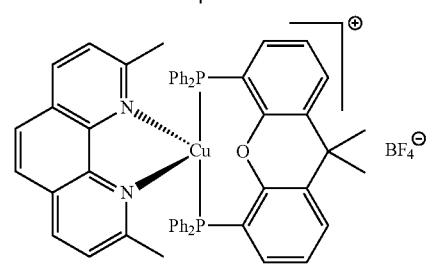
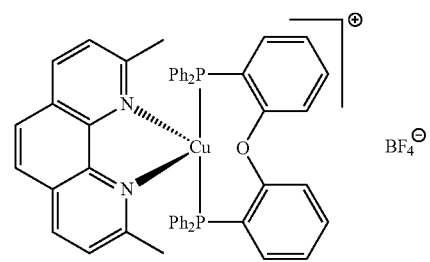
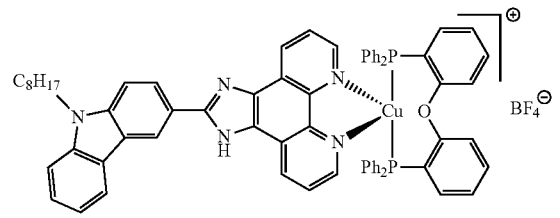
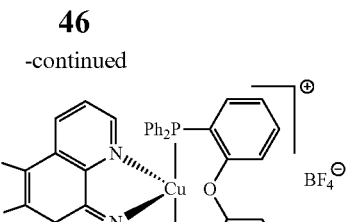
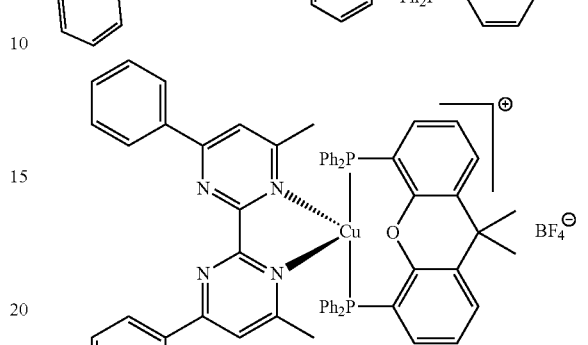
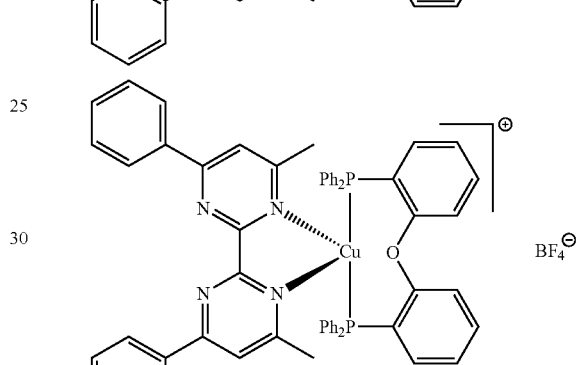
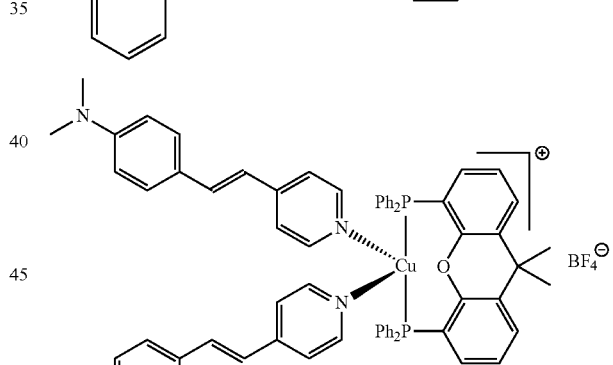
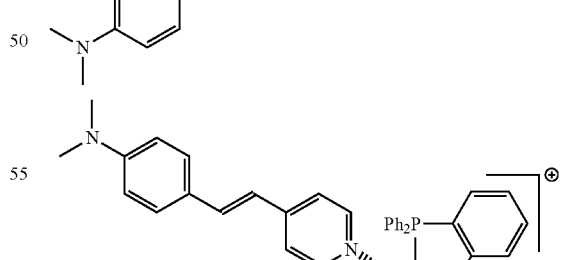
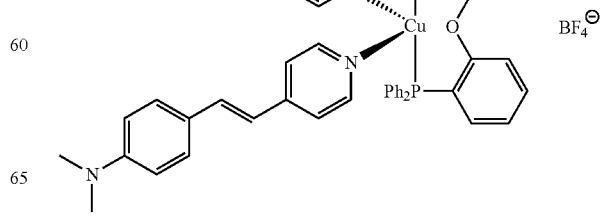

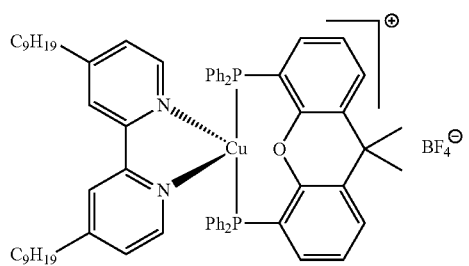

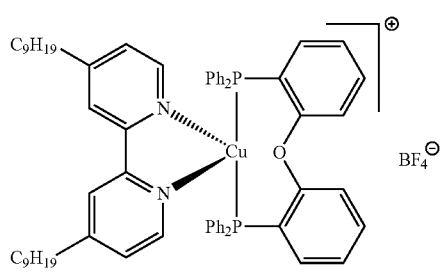

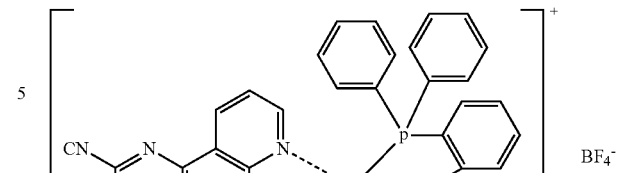

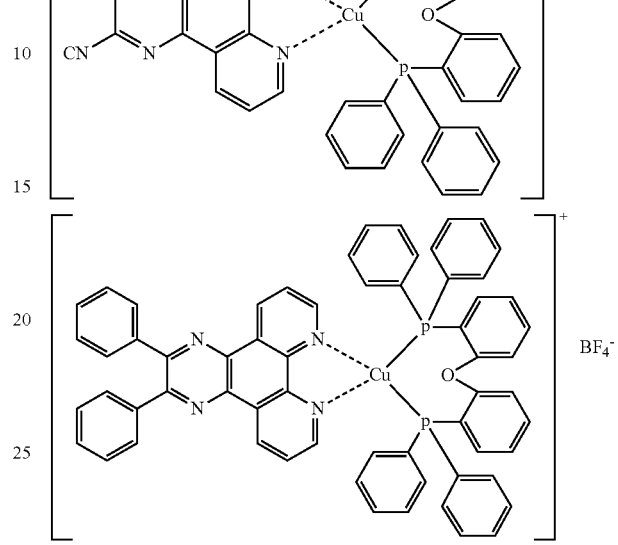

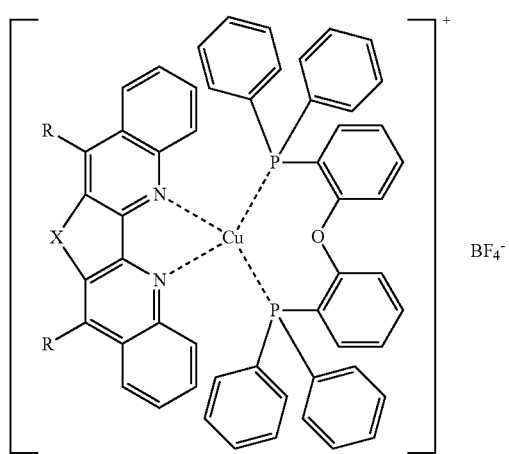

1b  R = H,    X = H, H
2b  R = C₆H₅, X = H, H
3b  R = C₆H₅, X = CH₂

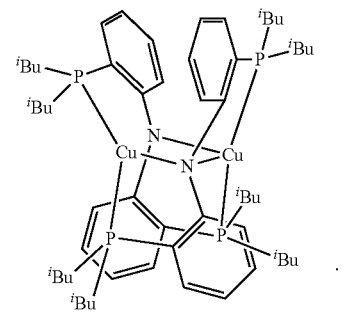

9. Photopolymerization method according to claim 3, wherein the ethylenically unsaturated monomer whose polymerization is effected by free radical polymerization is an acrylate or methacrylate.

10. Photopolymerization method according to claim 3, wherein the ethylenically unsaturated monomer whose polymerization is effected by cationic polymerization is a vinyl ester or an epoxyde.

11. Photopolymerization method according to claim 3, wherein the iodonium salt is:

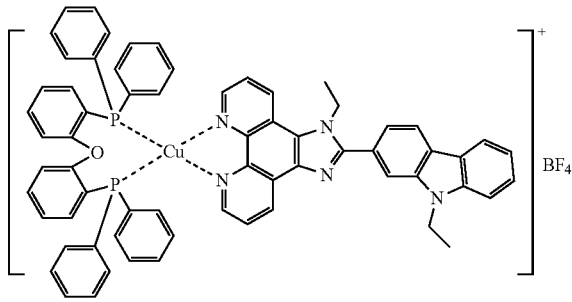

[Cu(POP)(ECl-Phen)]BF₄

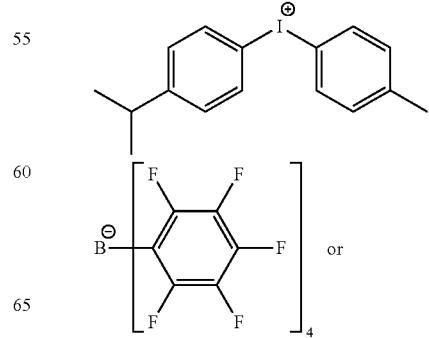

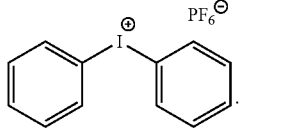

12. Photopolymerization method according to claim 3, wherein the vinyl cation initiator is triethyleneglycol divinyl ether or has the following structure:

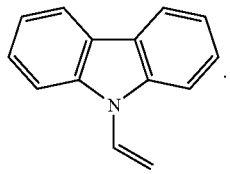

13. Polymer obtained by the method of claim 3, wherein the method is carried out with at least one ethylenically unsaturated monomer, the polymerization of which may be effected by free radical polymerization.

14. Polymer of claim 13, wherein said polymer has been photopolymerized at least in part from:
   the at least one ethylenically unsaturated monomer whose polymerization is effected by free radical polymerization, together with
   a second ethylenically unsaturated monomer or an epoxy-containing monomer whose polymerization is effected by cationic polymerization;
to form an interpenetrated network of polymers generated by concomitant free radical and cationic polymerizations.

15. Method for effecting free radical photopolymerisation or cationic photopolymerisation under light irradiation conditions ranging from $\lambda=200\text{-}900$ nm comprising initiating the photopolymerization with a copper complex of formula I or II:

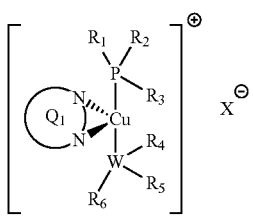

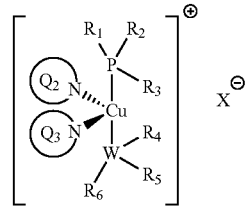

wherein $Q_1$, $Q_2$, $Q_3$, $R_1$-$R_6$, W and X are as defined in claim 1.

16. Method for the preparation of an interpenetrated network of at least two polymers whose polymerization is effected by free radical photopolymerization and cationic photopolymerization, respectively, under light irradiation conditions ranging from $\lambda=200\text{-}900$ nm comprising initiating the polymerization with a copper complex of formula I or II:

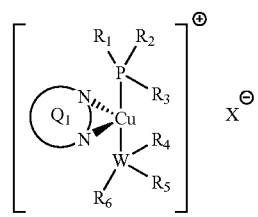

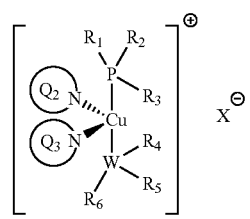

wherein $Q_1$, $Q_2$, $Q_3$, $R_1$-$R_6$, W and X are as defined in claim 1.

* * * * *